(12) United States Patent
Maki et al.

(10) Patent No.: US 12,535,472 B2
(45) Date of Patent: Jan. 27, 2026

(54) GAS SENSOR

(71) Applicant: NGK INSULATORS, LTD., Nagoya (JP)

(72) Inventors: Shintaro Maki, Nagoya (JP); Kota Katagiri, Nagoya (JP); Satoru Shiraishi, Nagoya (JP); Kohei Yaita, Nagoya (JP); Yuya Seike, Nagoya (JP); Daiki Hamamoto, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 293 days.

(21) Appl. No.: 18/489,980

(22) Filed: Oct. 19, 2023

(65) Prior Publication Data

US 2024/0142418 A1    May 2, 2024

(30) Foreign Application Priority Data

Oct. 26, 2022  (JP) ................... 2022-171646

(51) Int. Cl.
*G01N 33/00*    (2006.01)
(52) U.S. Cl.
CPC ................. *G01N 33/0009* (2013.01)
(58) Field of Classification Search
CPC ................................................ G01N 33/0009
See application file for complete search history.

(56) References Cited

U.S. PATENT DOCUMENTS

| | | | |
|---|---|---|---|
| 6,415,647 B1* | 7/2002 | Yamada | ............. G01N 27/4062 |
| | | | 73/23.31 |
| 2002/0038793 A1 | 4/2002 | Yamada et al. | |
| 2005/0011063 A1 | 1/2005 | Yamada et al. | |
| 2007/0113393 A1 | 5/2007 | Yamada et al. | |
| 2012/0295125 A1* | 11/2012 | Uchida | ................... B32B 15/18 |
| | | | 219/148 |

FOREIGN PATENT DOCUMENTS

| | | | |
|---|---|---|---|
| JP | 2002-174622 A | | 6/2002 |
| JP | 2015108511 A | * | 6/2015 |

OTHER PUBLICATIONS

English translation of JP-2015108511, accessed from iq.ip.com Sep. 22, 2025.*

* cited by examiner

*Primary Examiner* — Kristina M Deherrera
*Assistant Examiner* — Jean F Morello
(74) *Attorney, Agent, or Firm* — MATTINGLY & MALUR, PC

(57) ABSTRACT

Provided is a gas sensor including a housing made of metal through which a sensor element is inserted and an outer cylinder made of metal welded to an outer periphery of the housing, in which generation of pinholes on a surface of a welded portion is suppressed. In a gas sensor according to one aspect of the present invention, a contact distance Lg, which is a length in an axial direction of an outer peripheral surface of a housing in contact with an inner peripheral surface of an outer cylinder on a rear end side with respect to a molten portion of the outer cylinder formed by welding, is equal to or less than a reference distance Lr.

8 Claims, 6 Drawing Sheets

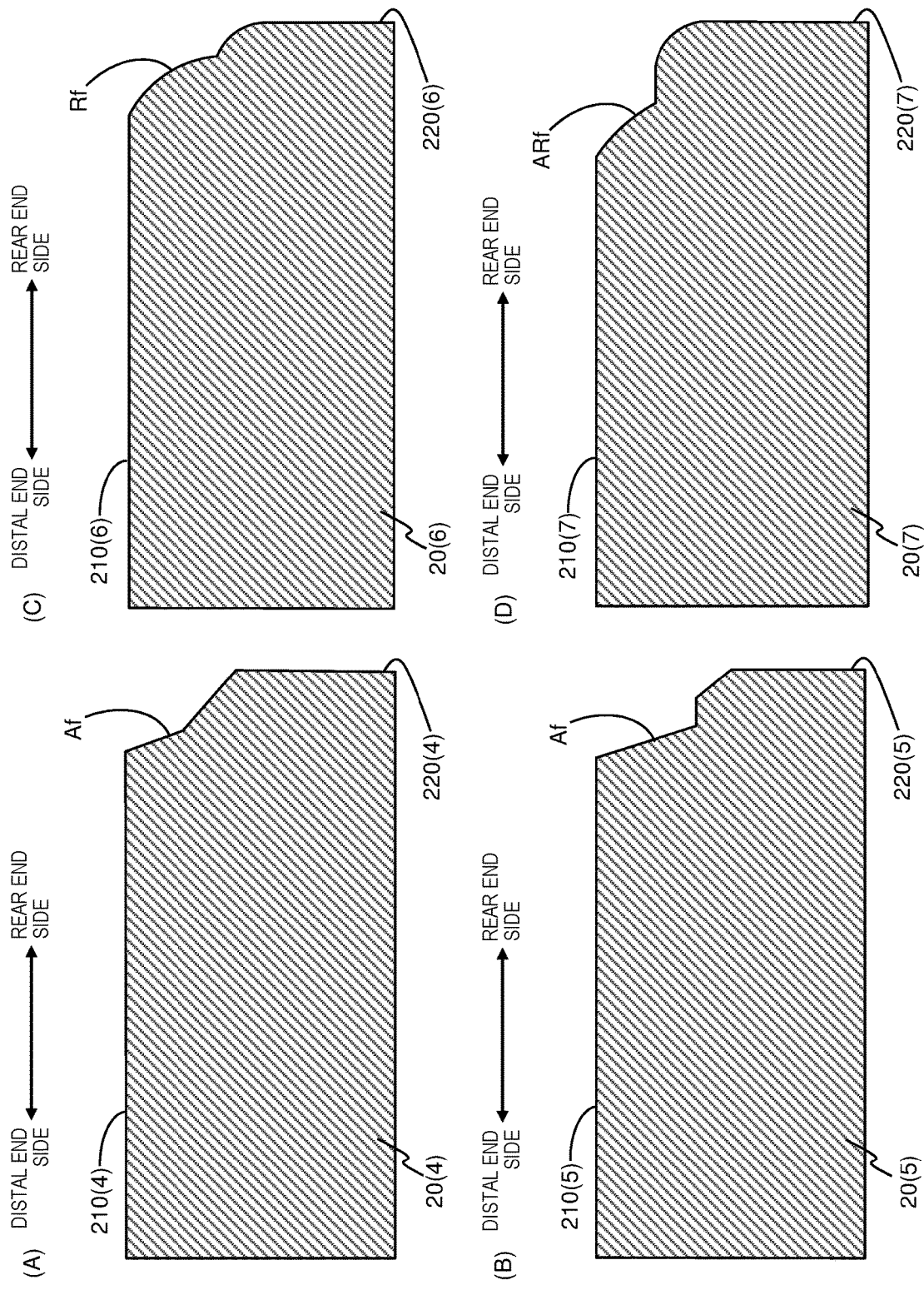

GAS SENSOR

CROSS-REFERENCE TO RELATED APPLICATION

The present application claims priority from Japanese application JP 2022-171646, filed on Oct. 26, 2022, the contents of which is hereby incorporated by reference into this application.

FIELD OF INVENTION

The present invention relates to a gas sensor.

BACKGROUND

Conventionally, a gas sensor that detects a specific gas concentration of oxygen, $NO_x$, or the like in a measurement gas such as an exhaust gas of an automobile, for example, is known to have the following configuration. That is, there is known a gas sensor including a housing having a cylindrical shape and made of metal, in which an elongated sensor element penetrates an inside in an axial direction and an outer cylinder made of metal welded to an outer periphery of the housing. For example, Japanese Patent Laid-open Publication No. 2002-174622 below discloses a gas sensor manufactured by press-fitting a part of the housing into the outer cylinder, and then welding the housing and the outer cylinder to each other at an overlapping portion in a circumferential direction to bond the housing and the outer cylinder to each other.

SUMMARY OF INVENTION

The present inventors have found that the following problem occurs when residual oil component or the like adheres to a contact surface between the housing and the outer cylinder when the gas sensor having the above-described configuration is welded. That is, the residual oil component or the like may become a volatile gas by heat during welding, and may appear as bubbles (pinholes) on the surface of the welded portion (welded portion surface) by being mixed in the weld metal.

When the pinholes are generated, there is a possibility that a defect such as corrosion occurs from the pinhole as a starting point, or the pinhole penetrates a member (for example, the outer cylinder) to deteriorate sealing performance occurs. In particular, when the gas sensor is used in a severe environment or for a long period of time, the possibility of occurrence of the defect increases. In order to prevent the occurrence of the defect, it is conceivable to sufficiently clean each of the housing and the outer cylinder so that an oil component or the like does not remain on a contact surface between the housing and the outer cylinder, but it is difficult to completely eliminate the residual oil component or the like.

The present invention has been made in view of such circumstances, and an object of the present invention is to provide a gas sensor including a housing made of metal through which a sensor element is inserted and a metal outer cylinder welded to an outer periphery of the housing, in which generation of pinholes on a surface of a welded portion is suppressed.

In order to solve the above-described problem, the present invention adopts the following configuration.

A gas sensor according to a first aspect includes: a housing having a cylindrical shape and made of metal, in which an elongated sensor element penetrates an inside in an axial direction; and an outer cylinder made of metal and mounted on an outer peripheral surface of the housing by press-fitting a part of a rear end side of the housing in the axial direction and performing welding in a circumferential direction at an overlapping portion with the press-fitted housing, in which a contact distance Lg, which is a length in the axial direction of the outer peripheral surface of the housing in contact with an inner peripheral surface of the outer cylinder on the rear end side with respect to a molten portion of the outer cylinder formed by the welding, is equal to or less than a reference distance Lr, and in which the reference distance Lr is calculated by the following formula (1).

$$Lr = k \times Da / (Tb \times Tc) \qquad \text{Formula (1)}$$

Here, in the formula (1), "k" represents a proportional constant, "Da" represents a depth from the outer peripheral surface of the housing to a deepest portion of the molten portion dissolved in the housing in a radial direction of the housing, "Tb" represents an interference which is a difference between an outer diameter of the housing and an inner diameter of the outer cylinder, and "Tc" represents the thickness of the outer cylinder. The molten portion may be rephrased as a portion of the outer cylinder whose structure is changed by melting.

In this configuration, the gas sensor includes the housing made of metal through which the sensor element is inserted, and the outer cylinder made of metal attached to an outer peripheral surface of the housing by press-fitting the housing and welding the housing in a circumferential direction at an overlapping portion with the housing. For example, laser welding is performed in the circumferential direction at the overlapping portion between the housing and the outer cylinder, whereby the outer cylinder is attached to the outer peripheral surface of the housing. In the gas sensor, the contact distance Lg is equal to or less than the reference distance Lr, and the reference distance Lr is calculated by the formula (1).

Here, the reference distance Lr indicates, for example, the maximum distance of the distance (reachable distances) by which the volatile gas obtained by volatilizing the residual oil component or the like adhering to the contact surface between the housing and the outer cylinder by the heat at the time of the welding can reach by its own pressure. That is, when the residual oil component or the like adheres to at least one of the outer peripheral surface of the housing and the inner peripheral surface of the outer cylinder in contact with each other, the residual oil component or the like is volatilized by heat at the time of the welding to generate a volatile gas. When the distance by which the volatile gas can move between the outer peripheral surface of the housing and the inner peripheral surface of the outer cylinder in contact with each other by its own pressure is referred to as a "reachable distance of the volatile gas", the reference distance Lr is a maximum value of the reachable distance.

The reachable distance of the volatile gas has the following relationship with each of the Da, the Tb, and the Tc. That is, as the Da representing the depth in the radial direction of the housing from the outer peripheral surface of the housing to the deepest portion of the molten portion dissolved in the housing increases, thermal deformation of the housing and the outer cylinder increases. That is, as the Da increases, the gap between the outer peripheral surface of the housing and the inner peripheral surface of the outer cylinder increases. Therefore, as the Da increases, the value of the diffusion resistance to the volatile gas decreases, and the reachable distance of the volatile gas moving between the outer peripheral surface of the housing and the inner peripheral surface of the outer cylinder increases. In addition, as the Tb representing the interference which is a difference between the outer diameter of the housing and the inner diameter of the outer cylinder increases, the value of the diffusion resistance to the volatile gas increases, and the reachable distance of the volatile gas moving between the outer peripheral surface of the housing and the inner peripheral surface of the outer cylinder decreases. Furthermore, as the Tc representing the thickness of the outer cylinder increases, the heat at the time of welding is more likely to be diffused, so that the generation amount of the volatile gas decreases, and the thermal deformation of the housing and the outer cylinder decreases. Therefore, as the Tc increases, the reachable distance of the volatile gas moving between the outer peripheral surface of the housing and the inner peripheral surface of the outer cylinder decreases. Since the Da, the Tb, and the Tc each have the above-described relationship with respect to the reachable distance, the reference distance Lr, which is the maximum value of the reachable distance, can be expressed as a function of the Da, the Tb, and the Tc. In addition, the k, which is a proportional constant, can be obtained by a test or the like. Therefore, the reference distance Lr is calculated by the formula (1) which is a function of the k, which is a proportional constant, and the Da, the Tb, and the Tc.

In the gas sensor, the contact distance Lg is equal to or less than the reference distance Lr, that is, the "length in the axial direction of the outer peripheral surface of the housing in contact with the inner peripheral surface of the outer cylinder on the rear end side of the molten portion of the outer cylinder" is equal to or less than the reference distance Lr. In other words, the length from the position of the "end point where the molten portion is in contact with the outer peripheral surface of the housing" (molten portion end) to the "position where the outer peripheral surface of the housing and the inner peripheral surface of the outer cylinder are not in contact with each other over the entire circumferential direction" (release position) is equal to or less than the reference distance Lr.

Therefore, at the time of the welding, the volatile gas generated between the outer peripheral surface of the housing and the inner peripheral surface of the outer cylinder in contact with each other can move to the position (release position) where the outer peripheral surface of the housing and the inner peripheral surface of the outer cylinder are not in contact with each other over the entire circumferential direction by its own pressure. At the time of the welding, for example, the volatile gas in the molten portion can move to the "position where the outer peripheral surface of the housing and the inner peripheral surface of the outer cylinder are not in contact with each other over the entire circumferential direction" by its own pressure. That is, the volatile gas generated at the time of the welding can move to the release position by its own pressure, and is released (discharged) at the release position. Therefore, in the gas sensor, it is possible to reduce the possibility that the volatile gas is trapped in the molten portion to generate pinholes in the molten portion, that is, to suppress the generation of pinholes in the molten portion.

Therefore, the gas sensor includes the housing made of metal through which the sensor element is inserted and the outer cylinder made of metal welded to the outer periphery of the housing, and the generation of pinholes in the molten portion can be suppressed.

In addition, in the gas sensor, it is possible to suppress the generation of pinholes in the molten portion by setting the contact distance Lg to be equal to or less than the reference distance Lr calculated by the formula (1). As described above, k, which is a proportional constant in the formula (1), can be obtained in advance by a test or the like. Therefore, the gas sensor can determine a structure for suppressing the generation of pinholes at the design stage, and for example, the value of the contact distance Lg can be determined to be equal to or less than the reference distance Lr at the design stage. Furthermore, in the gas sensor, it is possible to suppress the generation of pinholes to suppress a possibility of occurrence of defects such as generation of corrosion and deterioration in sealing performance caused by the pinholes. In addition, since the gas sensor can realize a structure that suppresses generation of pinholes at the design stage, the generation of pinholes can be suppressed without changing a welding condition or the like from a conventional one. In addition, since the gas sensor does not require a process of sufficiently cleaning each of the housing and the outer cylinder so that oil or the like does not remain on the contact surface between the housing and the outer cylinder, it is possible to suppress man-hours in management and processes required for manufacturing.

In the gas sensor according to a second aspect, in the gas sensor according to the first aspect, the reference distance Lr may be larger than 1.2 times the contact distance Lg. In this configuration, in the gas sensor, the reference distance Lr is larger than 1.2 times the contact distance Lg, that is, the contact distance Lg is smaller than 1/1.2 of the reference distance Lr. The present inventors have confirmed through the experiment that the number of pinholes generated in the molten portion is rapidly reduced by setting the contact distance Lg to be smaller than 1/1.2 of the reference distance Lr. Therefore, in the gas sensor, it is possible to extremely effectively suppress the generation of pinholes in the molten portion by setting the contact distance Lg to be smaller than 1/1.2 of the reference distance Lr.

In a gas sensor according to a third aspect, in the gas sensor according to the first or second aspect, chamfering may be performed on an end portion on the rear end side of the outer peripheral surface of the housing. In this configuration, in the gas sensor described above, chamfering may be performed on the end portion on the rear end side of the outer peripheral surface of the housing. For example, chamfering may be performed on the end portion on the rear end side of the outer peripheral surface of the housing linearly or curvilinearly. In the gas sensor, for example, at least one of C chamfering and R chamfering may be performed on the end portion on the rear end side of the outer peripheral surface of the housing. In the gas sensor, the end portion on the rear end side of the outer peripheral surface of the chamfered housing can be used as a guide when the housing is press-fitted into the outer cylinder, and the housing is easily press-fitted into the outer cylinder.

In a gas sensor according to a fourth aspect, in the gas sensor according to the third aspect, the chamfering may be R chamfering. In this configuration, in the gas sensor, the chamfering performed on the end portion on the rear end side of the outer peripheral surface of the housing is R chamfering. In the gas sensor, it is possible to suppress generation of burrs at the time of processing and suppress burr biting between the housing and the outer cylinder by employing R chamfering as chamfering performed on the end portion on the rear end side of the outer peripheral surface of the housing.

In a gas sensor according to a fifth aspect, in the gas sensor according to any one of the first to fourth aspects, a slit extending in the axial direction may be formed in at least one of the outer peripheral surface of the housing and the inner peripheral surface of the outer cylinder on the rear end side of the molten portion in the axial direction of each of the outer cylinder and the housing.

In this configuration, in the gas sensor, the slit extending in the axial direction is formed in at least one of the outer peripheral surface of the housing and the inner peripheral surface of the outer cylinder on the rear end side of the molten portion in the axial direction of each of the outer cylinder and the housing. In the gas sensor, the slit may extend to the end surface on the rear end side of the housing. Further, in the gas sensor, a plurality of the slits provided at intervals in the circumferential direction may be formed on at least one of the outer peripheral surface of the housing and the inner peripheral surface of the outer cylinder.

The present inventors have confirmed that the effect of suppressing the generation of pinholes can be improved by forming the slit extending in the axial direction on at least one of the outer peripheral surface of the housing and the inner peripheral surface of the outer cylinder as compared with the case where the slit is not formed. Therefore, in the gas sensor, it is possible to further improve the effect of suppressing the generation of pinholes in the molten portion by the slit extending in the axial direction as compared with the case where the slit is not formed.

According to the present invention, it is possible to provide the gas sensor including the housing made of metal through which the sensor element is inserted and the outer cylinder made of metal welded to the outer periphery of the housing, in which generation of pinholes on the surface of the welded portion is suppressed.

BRIEF DESCRIPTION OF DRAWINGS

FIG. 6 is an enlarged cross-sectional view showing examples of various kinds of chamfering performed on a corner portion of the housing.

DETAILED DESCRIPTION OF THE PREFERRED EMBODIMENTS

Figure 1:
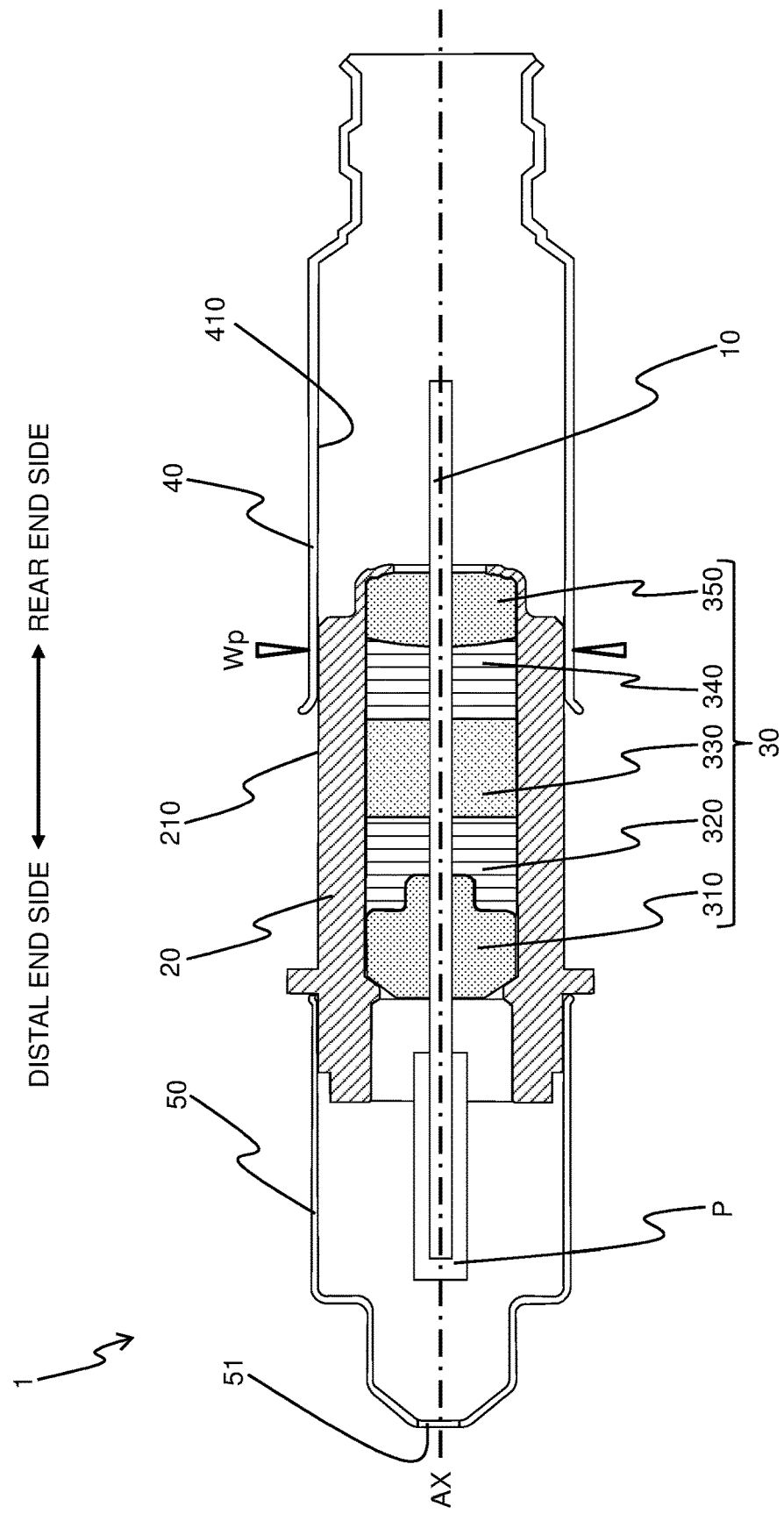
FIG. 1 is a schematic partial cross-sectional view schematically showing an example of a main configuration of a gas sensor according to an embodiment.

Hereinafter, an embodiment (hereinafter, also referred to as "the present embodiment") according to one aspect of the present invention will be described with reference to the drawings. However, the present embodiment described below is merely an example of the present invention in all respects. It goes without saying that various improvements and modifications can be made without departing from the scope of the present invention. That is, in carrying out the present invention, a specific configuration according to the embodiment may be appropriately adopted.

A gas sensor 1 described in detail below includes a housing 20 having a cylindrical shape in which an elongated sensor element 10 penetrates an inside in an axial direction AX, and an outer cylinder 40 attached to an outer peripheral surface 210 of the housing 20. Each of the housing 20 and the outer cylinder 40 is a member made of metal. After the rear end side of the housing 20 is press-fitted into the distal end side of the outer cylinder 40, welding is performed in the circumferential direction at the overlapping portion between the housing 20 and the outer cylinder 40, whereby the outer cylinder 40 is mounted on the outer peripheral surface 210 of the housing 20. For the gas sensor 1 having the configuration, when oil or the like is present on at least one of the outer peripheral surface 210 of the housing 20 and the inner peripheral surface 410 of the outer cylinder 40 that are in contact with each other at the time of welding, the oil or the like becomes a volatile gas by heat at the time of welding. Then, when the volatile gas is retained in a molten portion 420 of the outer cylinder 40 formed by welding without escaping from between the outer peripheral surface 210 of the housing 20 and the inner peripheral surface 410 of the outer cylinder 40, bubbles of the volatile gas, that is, pinholes are generated in the molten portion 420. The molten portion 420 may be rephrased as a portion whose structure is changed by melting.

The present inventors have studied a method for suppressing the generation of pinholes, and have confirmed that the generation of pinholes can be suppressed by configuring the gas sensor 1 to have the following configuration. That is, it has been confirmed that, in the gas sensor 1, the generation of pinholes in the molten portion 420 can be suppressed by allowing the volatile gas in the molten portion 420 to escape from between the outer peripheral surface 210 of the housing 20 and the inner peripheral surface 410 of the outer cylinder 40 in contact with each other.

Specifically, in the gas sensor 1, the outer peripheral surface 210 of the housing 20 and the inner peripheral surface 410 of the outer cylinder 40 are in contact with each other, but the volatile gas generated by the heat at the time of welding can move between the outer peripheral surface 210 and the inner peripheral surface 410 by its own pressure. Therefore, in the gas sensor 1, the distance (contact distance Lg) from the end portion (molten portion end Ef) on the rear end side of the molten portion 420 of the outer cylinder 40 to the position (non-contact position Np) where the outer peripheral surface 210 and the inner peripheral surface 410 are not in contact with each other is adjusted to satisfy the following condition. That is, the contact distance Lg of the gas sensor 1 is adjusted to be equal to or less than the "distance by which the volatile gas can move between the outer peripheral surface 210 and the inner peripheral surface 410 by its own pressure" (reachable distance).

In the gas sensor 1, by setting the contact distance Lg to be equal to or less than the reachable distance, the volatile gas in the molten portion 420 can escape from between the outer peripheral surface 210 of the housing 20 and the inner peripheral surface 410 of the outer cylinder 40. Therefore, in the gas sensor 1, it is possible to suppress the possibility that "the volatile gas is retained in the molten portion 420 without escaping from between the outer peripheral surface 210 and the inner peripheral surface 410, and pinholes are generated in the molten portion 420".

Hereinafter, the gas sensor 1 in which the generation of pinholes in the molten portion 420 is suppressed by setting the contact distance Lg to be equal to or less than the reachable distance, particularly, to be equal to or less than a reference distance Lr which is the maximum value of the reachable distance will be described in detail with reference to FIG. 1 and the like.

CONFIGURATION EXAMPLE (Overall Outline of Gas Sensor)

FIG. 1 is a schematic partial cross-sectional view schematically showing an example of a main configuration of a gas sensor 1 according to the present embodiment. In the present embodiment, an example in which the gas sensor 1 has the following configuration will be described in order to facilitate understanding of the relationship to be satisfied by the housing 20 and the outer cylinder 40 included in the gas sensor 1, particularly the condition to be satisfied by the contact distance Lg. That is, an example in which the gas sensor 1 includes the sensor element 10, the housing 20, the sensor element holding member 30, the outer cylinder 40, and the outer protection cover 50 will be described. However, the gas sensor 1 according to the present embodiment may have a configuration other than the sensor element 10, the housing 20, the sensor element holding member 30, the outer cylinder 40, and the outer protection cover 50.

The gas sensor 1 according to the present embodiment detects a predetermined measurement target gas component (for example, $NO_x$ and the like) in a measurement gas (for example, an exhaust gas) by the sensor element 10 provided inside the gas sensor 1. The gas sensor 1 includes the housing 20 having a cylindrical shape in which the sensor element 10 penetrates the inside in the axial direction AX, and the outer cylinder 40 attached to the outer peripheral surface 210 of the housing 20. The gas sensor 1 shown in FIG. 1 further includes the sensor element holding member 30 that has an insertion hole for holding the sensor element 10 and is made of a ceramic material, and the outer protection cover 50 having a bottomed cylindrical shape that surrounds (covers) the distal end side of the sensor element 10. As shown in FIG. 1, the outside of the gas sensor 1 mainly includes the outer protection cover 50, the housing 20, and the outer cylinder 40.

For example, the central axes of the gas sensor 1, the sensor element 10, the housing 20, the sensor element holding member 30, the outer cylinder 40, and the outer protection cover 50 are coaxial. In FIG. 1, the gas sensor 1 is shown in a mode in which the central axis (axis line) of the main body of the gas sensor 1 coincides with the left-right direction of the drawing. In the following description, unless otherwise specified, the left side in the drawing sheet is referred to as a distal end side of the gas sensor 1, and the right side in the drawing sheet is referred to as a rear end side of the gas sensor 1. The distal end side of the gas sensor 1 and the distal end side of the sensor element 10 are on the same side, and the rear end side of the gas sensor 1 and the rear end side of the sensor element 10 are on the same side.

(Sensor Element)

The sensor element 10 is an elongated columnar or thin plate member mainly made of an element body made of oxygen-ion conductive solid electrolyte ceramic such as zirconia. The sensor element 10 may be configured as an elongated tubular member or a tubular member. The sensor element 10 has a configuration in which a gas introduction port, an internal space, and the like are provided on the distal end side, and various electrodes and wiring patterns are provided on the surface and inside of the element body.

In the sensor element 10, the measurement gas introduced into the inner space is reduced or decomposed in the inner space to generate oxygen ions. In the gas sensor 1, the concentration of the gas component is obtained based on the fact that the amount of oxygen ions flowing inside the sensor element 10 is proportional to the concentration of a predetermined gas component in the measurement gas.

As shown in FIG. 1, for example, a predetermined range in the longitudinal direction from the distal end of the surface of the sensor element 10 may be covered with a protective film P. The protective film P is a porous film made of, for example, $Al_2O_3$ or the like and having a thickness of about 10 μm to 2000 μm, provided to protect the vicinity of the distal end of the sensor element 10 from thermal shock, and is also referred to as a thermal shock resistant protective layer. In light of the purpose, the protective film P is preferably formed so as to be able to withstand a force of up to about 50 N. The formation range of the protective film P is appropriately determined according to the specific structure of the sensor element 10.

An end portion of the sensor element 10, which is an elongated columnar or thin plate member, on a side where the protective film P is not provided is a rear end of the sensor element 10. In the gas sensor 1, the sensor element 10 penetrates the inside of the housing 20 having a cylindrical shape in the axial direction AX, and a front end covered with the protective film P and a rear end not covered with the protective film P protrude from the housing 20.

(Housing)

The housing 20 is a member having a cylindrical shape in which the sensor element 10 penetrates the inside in the axial direction AX, and is made of metal. The housing 20 includes an accommodation space having a cylindrical shape in which the sensor element 10 and the like are housed, and is used to fix the gas sensor 1 at the measurement position.

The housing 20 includes, for example, a protruding portion (flange) protruding in the radial direction, and the protruding portion may be provided over the entire circumferential direction. The protruding portion is a member that comes into contact with an external member (for example, an exhaust pipe) (not shown) to which the gas sensor 1 is attached and prevents leakage of the measurement gas from a space (for example, inside the exhaust pipe) defined by the external member.

For example, a fixing bolt (not shown) may be annularly mounted on the outer periphery of the housing 20 in a mode of being in contact with the protruding portion. The fixing bolt is made of metal, for example, and has an outer peripheral surface provided with an external thread. The housing 20 is inserted into a "fixing member (mounted portion, boss) that is welded to the exhaust pipe and has an inner peripheral surface provided with a female thread", and the fixing bolt is inserted into the fixing member in a state where the protruding portion and the fixing member are in contact with each other. In this manner, the housing 20 is fixed in the fixing member, that is, the gas sensor 1 is fixed in the exhaust pipe. The protruding portion (in particular, the surface of the protruding portion on the distal end side) abuts on a surface of the exhaust pipe (fixing member) to form a sealing surface, thereby preventing the measurement gas from leaking to the outside of the exhaust pipe.

Note that the housing 20 may be configured by configuring the distal end side and the rear end side of the housing 20 shown in FIG. 1 as separate members, and connecting and fixing the member on the distal end side and the member on the rear end side by welding or the like. For example, the housing 20 may include a main metal fitting made of metal (a member corresponding to the distal end side of the housing 20 shown in FIG. 1) having a protruding portion, and an inner cylinder having a cylindrical shape (a member corresponding to the rear end side of the housing 20 shown in FIG. 1) welded and fixed to the main metal fitting. In the present embodiment, the housing 20 may be a member having a cylindrical shape and made of metal in which the sensor element 10 penetrates the inside in the axial direction AX, and the housing 20 may be configured by one member having a cylindrical shape or may be configured by connecting a plurality of members having a cylindrical shape coaxially.

As described above, the sensor element 10 is accommodated in the accommodation space provided inside the housing 20 having a cylindrical shape. For example, in the accommodation space, the sensor element 10 is disposed such that the longitudinal direction thereof coincides with the axial direction AX of the housing 20 having a cylindrical shape, and specifically, is disposed such that the central axis of the sensor element 10 and the central axis of the housing 20 are coaxial. The position of the sensor element 10 accommodated in the accommodation space included in the housing 20 in this mode is held by the sensor element holding member 30.

(Sensor Element Holding Member)

The sensor element holding member 30 is a member made of a ceramic material that is in contact with the sensor element 10 and holds the sensor element 10 in the housing 20. The sensor element holding member 30 shown in FIG. 1 includes ceramic supporters 310, 330, and 350 and green compacts 320 and 340. The sensor element holding member 30 may further include a washer (not shown). Each of the ceramic supporters 310, 330, and 350 and the green compacts 320 and 340 has an insertion hole for holding the sensor element 10, and is annularly mounted on sensor element 10. That is, in the gas sensor 1, in a state where the sensor element 10 is disposed on the central axis of the housing 20 (the central axis of the gas sensor 1), the ceramic supporters 310, 330, and 350 and the green compacts 320 and 340 are annularly mounted along the central axis. FIG. 1 shows an example in which the ceramic supporter 310, the green compact 320, the ceramic supporter 330, the green compact 340, and the ceramic supporter 350 are annularly mounted on the sensor element 10 in this order from the distal end side to the rear end side. Further, the above-described washer may be annularly mounted on the sensor element 10 in a state of being in contact with the ceramic supporter 350 on the rear end side of the ceramic supporter 350. In the following description, the ceramic supporters 310, 330, and 350, the green compacts 320 and 340, and the above-described washer are also collectively referred to as an "annular component".

Each of the ceramic supporters 310, 330, and 350 is an insulator made of ceramics. Each of the green compact 320 and the green compact 340 is obtained by molding a ceramic powder such as talc.

For example, as shown in FIG. 1, a tapered portion is provided on the distal end side inside the housing 20, and the ceramic supporters 310, 330, and 350, the green compacts 320 and 340, and the washer (not shown) annularly mounted on the sensor element 10 are locked (fixed). This is realized by fitting the housing 20 to the outer periphery of the annular component in a state where the annular component is annularly mounted on the sensor element 10 in advance. In addition, by compressing each of the green compacts 320 and 340 by applying a predetermined load to the washer from the rear end side to the distal end side after the above-described locking is performed, the space between both end portions of the sensor element 10 is sealed inside the housing 20. By crimping the housing 20 on the rear end side of the washer in a reduced diameter state with the sealing, the annular component is restrained, and airtightness between both the end portions of the sensor element 10 is secured. That is, in the internal space of the housing 20, the ceramic supporters 310, 330, and 350 and the green compacts 320 and 340 annularly mounted on the sensor element 10 are sandwiched and sealed by the inner surface (inner wall) of the housing 20, particularly, the inner wall of the tapered portion and the washer. Here, the position of the housing 20 adjacent to the green compact 340 may be crimped in a reduced diameter shape to further improve the airtightness between both the end portions of the sensor element 10.

Although not shown, in the gas sensor 1, a connector for achieving electrical connection between the sensor element 10 and the outside may be connected to a plurality of terminal electrodes included in the sensor element 10 at a position inside the outer cylinder 40 and on the rear end side of the housing 20. A cable extending from the connector may be pulled out from an opening portion provided at the rear end of the outer cylinder 40. The opening portion provided at the rear end of the outer cylinder 40 may be further used as an inflow and outflow portion of the atmospheric air as the reference gas.

The rear end side of the housing 20 having a cylindrical shape accommodating the sensor element 10 and the sensor element holding member 30 in the internal space is press-fitted to the distal end side of the outer cylinder 40. The outer cylinder 40 is attached to the outer peripheral surface 210 of the housing 20 by welding in the circumferential direction at an overlapping portion of the outer cylinder 40 with the housing 20. In the example shown in FIG. 1, the outer cylinder 40 is attached to the outer peripheral surface 210 of the housing 20 by welding in the circumferential direction at a welding position Wp.

(Outer Cylinder)

The outer cylinder 40 is a member having a cylindrical shape and made of metal that is annularly mounted on the outer peripheral surface 210 (in particular, the outer peripheral surface 210 on the rear end side) of the housing 20 and protects a portion of the gas sensor 1 that is not in contact with the measurement gas. That is, the outer cylinder 40 is fixed to the housing 20 by a part of the outer peripheral surface 210 on the rear end side of the housing 20 being in close contact with the inner peripheral surface 410. The annular mounting of the outer cylinder 40 with respect to the housing 20 and the close fixing of the outer cylinder 40 and the housing 20 at that time are realized by press-fitting a part of the rear end side of the housing 20 into the outer cylinder 40.

The inner space of the outer cylinder 40 is a reference gas existing space in which the atmospheric air as the reference gas exists. The inner space of the outer cylinder 40 is separated from a pipe or the like in which the measurement gas is present inside the exhaust pipe or the like of the engine in a state where the gas sensor 1 is attached to the pipe or the like, for example. However, the inner space of the outer cylinder 40 is not sealed, and the atmospheric air can enter and leave the inner space of the outer cylinder 40 at an opening portion provided at a rear end portion (not shown) of the outer cylinder 40.

(Outer Protection Cover)

The outer protection cover 50 is a member having a bottomed cylindrical shape that surrounds (covers) the distal end of the sensor element 10, and is made of metal, for example. The outer protection cover 50 protects the distal end of the sensor element 10 and the vicinity thereof, which are portions in direct contact with the measurement gas, when the gas sensor 1 is used. As shown in FIG. 1, the outer protection cover 50 is formed with a through hole 51 that allows the flow of the measurement gas from the outside to the inside. FIG. 1 shows an example in which the through hole 51 is formed in the bottom surface (the surface on the distal end side of the gas sensor 1) of the outer protection cover 50 which is a member having a bottomed cylindrical shape. However, the arrangement mode of the through holes 51 shown in FIG. 1 is merely an example, and the arrangement position and the number of the through holes 51 may be appropriately determined in consideration of the inflow mode of the measurement gas into the outer protection cover 50. For example, a plurality of through holes 51 may be formed in the side surface of the outer protection cover 50 which is a member having a bottomed cylindrical shape. A plurality of through holes 51 may be formed in the bottom surface of the outer protection cover 50.

The outer protection cover 50 is attached to the outer peripheral surface 210 on the distal end side of the housing 20. For example, the inner peripheral surface of the rear end side (opening edge) of the outer protection cover 50 abuts on the housing 20, whereby the outer protection cover 50 is fixed to the housing 20.

In the gas sensor 1 shown in FIG. 1, the opening edge of the outer protection cover 50 having a bottomed cylindrical shape is in contact with the protruding portion of the housing 20. However, it is not essential for the gas sensor 1 that the opening edge of the outer protection cover 50 and the protruding portion of the housing 20 are in contact with each other, and a gap may be provided therebetween. For example, a water flow groove (not shown) may be provided between the protruding portion of the housing 20 and the opening edge of the outer protection cover 50 having a bottomed cylindrical shape. The water flow groove extends in the circumferential direction of the housing 20 having a cylindrical shape, and may be provided around the outer periphery of the housing 20, for example.

The diameter of the bottom surface (bottom portion) of the water flow groove described above may be smaller (or shorter) than the diameter of the opening edge of the outer protection cover 50, that is, the length of the bottom surface to the axis (central axis) of the housing 20 may be shorter than the length of the opening edge of the outer protection cover 50 to the axis of the housing 20. In other words, the length from the bottom surface (the outer periphery of the bottom surface) of the water flow groove to the axis of the housing 20 may be shorter than the length from the opening edge of the outer protection cover 50 to the axis of the housing 20.

The outer protection cover 50 shown in FIG. 1 includes a large-diameter portion having a cylindrical shape and a distal end portion having a bottomed cylindrical shape connected to the large-diameter portion and having a smaller diameter than the large-diameter portion. In other words, in the present embodiment, the outer protection cover 50 having a bottomed cylindrical shape has a body portion having a cylindrical shape and a distal end portion having a bottomed cylindrical shape and an inner diameter smaller than that of the body portion. The body portion includes a side portion having a side surface along the central axis direction of the outer protection cover 50, and a step portion which is a bottom portion of the body portion and connects the side portion and the distal end portion. However, for the gas sensor 1, it is not essential for the outer protection cover 50 to have such a configuration, and it is not essential for the outer protection cover 50 to have the body portion and the distal end portion. In other words, it is not essential for the gas sensor 1 that the outer protection cover 50 has a configuration in which the side surface of the body portion having a cylindrical shape and the distal end portion having a bottomed cylindrical shape are connected by the step portion. For the gas sensor 1, the outer protection cover 50 only needs to have a bottomed cylindrical shape that covers the distal end of the sensor element 10. For example, the outer protection cover 50 may have a configuration in which the side surface of the body portion having a cylindrical shape and the distal end portion having a bottomed cylindrical shape are directly connected without interposing the step portion. For example, the outer protection cover 50 may include a plurality of step portions. That is, the outer protection cover 50 may include a large-diameter portion having a cylindrical shape, a body portion having a cylindrical shape connected to the large-diameter portion and having a diameter smaller than that of the large-diameter portion, and a distal end portion connected to the body portion, the distal end portion having an inner diameter smaller than that of the body portion and having a bottomed cylindrical shape. That is, in the present embodiment, the outer protection cover 50 only needs to have a bottomed tubular shape that covers the distal end of the sensor element 10, and what shape is included in addition to the bottomed tubular shape is appropriately selected according to the use method, the use location, and the like of the gas sensor 1.

With the above-described configuration, in the gas sensor 1, the measurement gas existing space around the distal end of the sensor element 10 and the reference gas existing space around the rear end are completely separated from each other in a state where the gas sensor 1 is attached to a predetermined position. Accordingly, the gas sensor 1 can accurately measure the concentration of the measurement target gas component in the measurement gas.

(Arrangement of Gas Sensor)

As described above, the gas sensor 1 includes the housing 20 having a cylindrical shape and made of metal in which the elongated sensor element 10 penetrates the inside in the axial direction AX, and the outer cylinder 40 made of metal attached to the outer peripheral surface 210 of the housing 20. The outer cylinder 40 is attached to the outer peripheral surface 210 of the housing 20 by press-fitting a part of the rear end side of the housing 20 and welding in the circumferential direction at an overlapping portion with the press-fitted housing 20. In the example shown in FIG. 1, the outer cylinder 40 is attached to the outer peripheral surface 210 of the housing 20 by welding in the circumferential direction at a welding position Wp.

In the gas sensor 1, the contact distance Lg, which is the length in the axial direction AX of the outer peripheral surface 210 of the housing 20 in contact with the inner peripheral surface 410 of the outer cylinder 40 on the rear end side of the molten portion 420 of the outer cylinder 40 formed by welding, is equal to or less than the reference distance Lr. Hereinafter, the contact distance Lg will be described in detail with reference to FIG. 2 and the like.

(Contact Distance)

Figure 2:
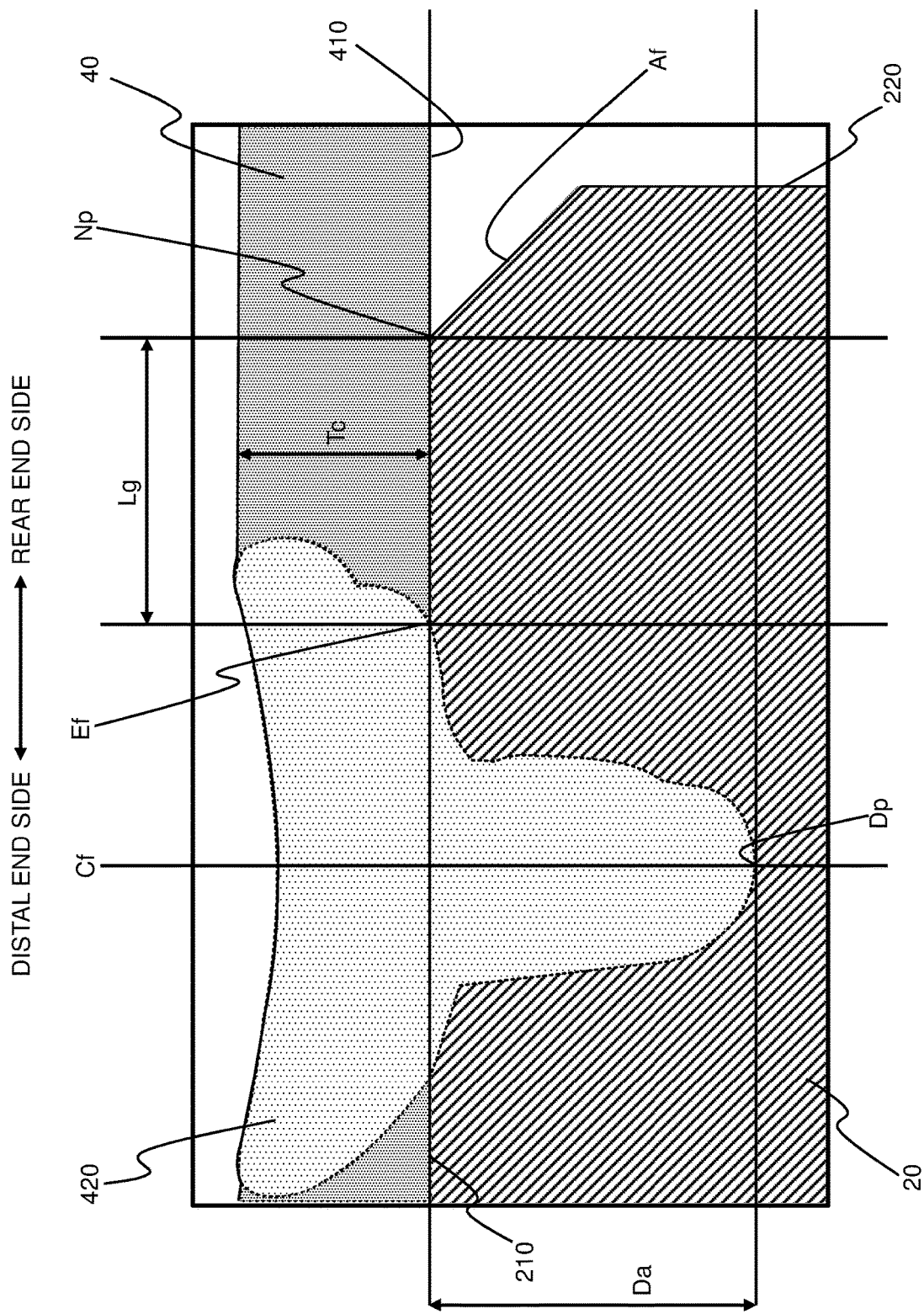
FIG. 2 is an enlarged cross-sectional view schematically showing a relationship between a housing and an outer cylinder around a welding position in the gas sensor of FIG. 1.

FIG. 2 is an enlarged cross-sectional view schematically showing a relationship between the housing 20 and the outer cylinder 40 around the welding position Wp in the gas sensor 1, and particularly is a view for explaining the contact distance Lg in detail. In FIG. 2, the horizontal direction of the drawing sheet is the axial direction AX.

As shown in FIG. 2, the molten portion 420 of the outer cylinder 40 formed by welding is dissolved in the housing 20, and the outer peripheral surface 210 of the housing 20 and the inner peripheral surface 410 of the outer cylinder 40 are in contact with each other around the molten portion 420. In the example shown in FIG. 2, chamfering is performed on the end portion on the rear end side of the outer peripheral surface 210 of the housing 20, that is, chamfering is performed on the corner portion on the rear end side of the housing 20. Specifically, in the housing 20 shown in FIG. 2, C chamfering is performed on the end portion on the rear end side of the outer peripheral surface 210, and a corner surface Af having a linear cross-sectional shape is formed between the outer peripheral surface 210 of the housing 20 and the rear end surface 220 of the housing 20.

In the drawing, a "molten portion center Cf" indicates the center in the axial direction AX of the molten portion 420 of the outer cylinder 40 formed by welding. The molten portion 420 may be rephrased as a portion of the outer cylinder 40 whose structure is changed by melting.

The "molten portion end Ef" in the drawing indicates an end point where the molten portion 420 is in contact with the outer peripheral surface 210 of the housing 20 on the rear end side of the molten portion center Cf in the axial direction AX. The molten portion end Ef may be rephrased as a rear end in the axial direction AX of the molten portion 420 in contact with the housing 20. Further, the molten portion end Ef may be rephrased as a contact position between the outer peripheral surface 210 of the housing 20, the inner peripheral surface 410 of the outer cylinder 40, and the molten portion 420 on the rear end side of the molten portion center Cf in the axial direction AX. The outer peripheral surface 210 of the housing 20 and the inner peripheral surface 410 of the outer cylinder 40 are in contact with each other on the rear end side of the melted portion end Ef in the axial direction AX.

The "non-contact position Np" in the drawing indicates a position where the outer peripheral surface 210 of the housing 20 and the inner peripheral surface 410 of the outer cylinder 40 are not in contact with (are not in contact with) each other on the rear end side of the molten portion center Cf in the axial direction AX. That is, the non-contact position Np indicates a position on the most distal end side where the outer peripheral surface 210 of the housing 20 and the inner peripheral surface 410 of the outer cylinder 40 are not in contact with each other on the rear end side with respect to the molten portion center Cf, and is also referred to as a "release position". The non-contact position Np may be rephrased as a position where the outer peripheral surface 210 of the housing 20 and the inner peripheral surface 410 of the outer cylinder 40 are not in contact with each other over the entire circumferential direction on the rear end side of the molten portion center Cf. Further, the non-contact position Np may be rephrased as a rear end of the outer peripheral surface 210 of the housing 20. As described above, in the example shown in FIG. 2, chamfering (C chamfering) is performed on the end portion on the rear end side of the outer peripheral surface 210 of the housing 20. Therefore, the non-contact position Np may be rephrased as a rear end of the outer peripheral surface 210 of the housing 20 after the chamfering is performed.

A "penetration depth Da" in the drawing indicates a depth in the radial direction of the housing 20 from the outer peripheral surface 210 of the housing 20 to a deepest portion Dp of the molten portion 420 dissolved in the housing 20. The deepest portion Dp may be rephrased as a position of the molten portion 420 dissolved deepest in the housing 20 in the radial direction of the housing 20 in the molten portion 420 of the outer cylinder 40 dissolved in the housing 20 by welding.

A "thickness Tc" in the drawing indicates the thickness of the outer cylinder 40 which is a member having a cylindrical shape and made of metal, that is, indicates the difference between the outer diameter and the inner diameter of the outer cylinder 40.

In the example shown in FIG. 2, the outer peripheral surface 210 of the housing 20 and the inner peripheral surface 410 of the outer cylinder 40 are in contact with each other between the molten portion end Ef and the non-contact position Np, and in particular, the outer peripheral surface 210 and the inner peripheral surface 410 are in contact with each other over the entire circumferential direction. On the rear end side of the non-contact position Np in the axial direction AX, the outer peripheral surface 210 of the housing 20 and the inner peripheral surface 410 of the outer cylinder 40 are not in contact with each other, and in particular, the outer peripheral surface 210 and the inner peripheral surface 410 are not in contact with each other over the entire circumferential direction.

Here, as described above, the contact distance Lg is the length in the axial direction AX of the outer peripheral surface 210 of the housing 20 in contact with the inner peripheral surface 410 of the outer cylinder 40 on the rear end side of the molten portion 420. Therefore, in the example shown in FIG. 2, the contact distance Lg can also be regarded as a distance between the position of the molten portion end Ef and the non-contact position Np. That is, in the example shown in FIG. 2, the contact distance Lg may be rephrased as a length in the axial direction AX of the outer peripheral surface 210 of the housing 20 that is in contact with the inner peripheral surface 410 of the outer cylinder 40 over the entire circumferential direction on the rear end side of the molten portion 420.

The gas sensor 1 according to the present embodiment makes the contact distance Lg equal to or less than the reference distance Lr so that the volatile gas in the molten portion 420 of the outer cylinder 40 can escape from between the outer peripheral surface 210 of the housing 20 and the inner peripheral surface 410 of the outer cylinder 40.

As described above, the reference distance Lr is, for example, the maximum value of the reachable distance which is the "distance by which the volatile gas can move between the outer peripheral surface 210 and the inner peripheral surface 410 by its own pressure". That is, the reference distance Lr indicates, for example, the maximum distance of the distance (reachable distances) by which the volatile gas obtained by volatilizing the residual oil component or the like adhering to the contact surface between the housing 20 and the outer cylinder 40 by the heat at the time of welding can reach by its own pressure. The reachable distance of the volatile gas has the following relationship with each of the penetration depth Da, an interference Tb representing the interference which is the difference between the outer diameter of the housing 20 and the inner diameter of the outer cylinder 40, and the thickness Tc of the outer cylinder 40.

That is, as the penetration depth Da representing the "depth in the radial direction of the housing 20 from the outer peripheral surface 210 of the housing 20 to the deepest portion Dp of the molten portion 420 dissolved in the housing 20" increases, the thermal deformation of the housing 20 and the outer cylinder 40 increases. That is, as the penetration depth Da increases, the gap between the outer peripheral surface 210 of the housing 20 and the inner peripheral surface 410 of the outer cylinder 40 increases. Therefore, as the penetration depth Da increases, the value of the diffusion resistance for the volatile gas that tries to move between the outer peripheral surface 210 and the inner peripheral surface 410 decreases, and the reachable distance of the volatile gas increases.

In addition, as the interference Tb representing the "interference which is the difference between the outer diameter of the housing 20 and the inner diameter of the outer cylinder 40" increases, the value of the diffusion resistance with respect to the volatile gas trying to move between the outer peripheral surface 210 and the inner peripheral surface 410 increases. Therefore, as the interference Tb increases, the reachable distance of the volatile gas decreases.

Furthermore, as the thickness Tc representing the "thickness of the outer cylinder 40" increases, the heat at the time of welding is more likely to be diffused, so that the generation amount of the volatile gas decreases, and the thermal deformation of the housing 20 and the outer cylinder 40 decreases. Therefore, as the thickness Tc increases, the reachable distance of the volatile gas moving between the outer peripheral surface 210 of the housing 20 and the inner peripheral surface 410 of the outer cylinder 40 decreases.

As described above, as the penetration depth Da increases, the reachable distance of the volatile gas increases, as the interference Tb increases, the reachable distance of the volatile gas decreases, and as the thickness Tc increases, the reachable distance of the volatile gas decreases. Since the penetration depth Da, the interference Tb, and the thickness Tc each have the above-described relationship with respect to the reachable distance, the reference distance Lr, which is the maximum value of the reachable distance, can be expressed as a function of the penetration depth Da, the interference Tb, and the thickness Tc. That is, the reference distance Lr is calculated by the following formula (1) with "k" as a proportional constant.

$$Lr = k \times Da / (Tb \times Tc)$$  Formula (1)

(Calculation of Proportional Constant k)

Here, the present inventors have calculated the proportional constant k in the above formula (1) as follows. First, the present inventors manufactured a gas sensor 1 (Ref) in which a penetration depth Da is Da (Ref), an interference Tb is Tb (Ref), a thickness Tc of the outer cylinder 40 is Tc (Ref), and a contact distance Lg is a contact distance Lg (Ref). With respect to the gas sensor 1 (Ref), the present inventors have confirmed that the number of pinholes generated in the molten portion 420 is reduced by changing at least one of the penetration depth Da, the interference Tb, and the thickness Tc of the outer cylinder 40 so as to increase the reference distance Lr. In other words, the present inventors have confirmed that the number of generated pinholes is reduced by changing at least one of the penetration depth Da, the interference Tb, and the thickness Tc of the outer cylinder 40 so as to increase the reachable distance of the volatile gas for the gas sensor 1 (Ref). In addition, the present inventors have confirmed that the number of pinholes generated in the molten portion 420 is increased by changing at least one of the penetration depth Da, the interference Tb, and the thickness Tc of the outer cylinder 40 so as to reduce the reference distance Lr for the gas sensor 1 (Ref). In other words, the present inventors have confirmed that the number of generated pinholes is reduced by changing at least one of the penetration depth Da, the interference Tb, and the thickness Tc of the outer cylinder 40 so as to reduce the reachable distance of the volatile gas for the gas sensor 1 (Ref). From these confirmations, the present inventors have determined that the contact distance Lg is equal to the reference distance Lr in the gas sensor 1 (Ref). That is, the present inventors have determined that the contact distance Lg (Ref), which is the contact distance Lg in the gas sensor 1 (Ref), is equal to the reference distance Lr in the gas sensor 1 (Ref).

Therefore, the present inventors substituted Da=Da (Ref), Tb=Tb (Ref), Tc=Tc (Ref), and Lr=Lg (Ref) into the above-described formula (1) to calculate the proportional constant k, specifically, to calculate k (Ref) as the proportional constant k.

(Specify Reference Distance Lr and Determine Contact Distance Lg)

Since the proportional constant k can be specified (that is, it could be specified that the proportional constant k is k (Ref)), the reference distance Lr of the gas sensor 1 can be calculated from the penetration depth Da, the interference Tb, the thickness Tc of the outer cylinder 40, and the proportional constant k on the basis of the formula (1). By setting the contact distance Lg of the gas sensor 1 to be equal to or less than the calculated reference distance Lr, the gas sensor 1 can achieve the following effects. That is, the gas sensor 1 can suppress the possibility that "the volatile gas is retained in the molten portion 420 without escaping from between the outer peripheral surface 210 and the inner peripheral surface 410, and pinholes are generated in the molten portion 420", that is, generation of pinholes in the molten portion 420.

As described above, when the contact distance Lg of the gas sensor 1 is equal to or less than the reference distance Lr, the gas sensor 1 can suppress the generation of pinholes in the molten portion 420. Further, the present inventors have further confirmed in the experiment that it is desirable to make the contact distance Lg smaller than the reference distance Lr, and in particular, it is more desirable to make the contact distance Lg smaller than 1/1.2 of the reference distance Lr. Specifically, the present inventors have confirmed through the experiment that the number of pinholes generated in the molten portion 420 is rapidly reduced by setting the contact distance Lg to be smaller than 1/1.2 of the reference distance Lr. Details of the experiment will be described later.

Therefore, in the gas sensor 1, the reference distance Lr may be larger than 1.2 times the contact distance Lg, that is, the contact distance Lg may be smaller than 1/1.2 of the reference distance Lr. As described above, by setting the contact distance Lg to be smaller than 1/1.2 of the reference distance Lr, the number of pinholes generated in the molten portion 420 rapidly decreases. Therefore, in the gas sensor 1, it is possible to extremely effectively suppress the generation of pinholes in the molten portion 420 by setting the contact distance Lg to be smaller than 1/1.2 of the reference distance Lr.

(Shape of Corner Portion of Housing)

As described above, in the housing 20 shown in FIG. 2, chamfering is performed on the end portion (corner portion) on the rear end side of the outer peripheral surface 210, specifically, C chamfering is performed. That is, FIG. 2 shows an example in which the corner portion (corner portion on the rear end side) of the housing 20 facing the inner peripheral surface 410 of the outer cylinder 40 is chamfered, and the corner surface Af having a linear cross-sectional shape is formed between the outer peripheral surface 210 of the housing 20 and the rear end surface 220 of the housing 20.

In the gas sensor 1, chamfering may be performed on the end portion on the rear end side of the outer peripheral surface 210 of the housing 20. For example, as shown in FIG. 2, chamfering may be performed on the end portion on the rear end side of the outer peripheral surface 210 of the housing 20 linearly. Specifically, in the gas sensor 1 shown in FIG. 2, C chamfering is performed on the end portion on the rear end side of the outer peripheral surface 210 of the housing 20. In the gas sensor 1, the end portion on the rear end side of the outer peripheral surface 210 of the chamfered housing 20 can be used as a guide when the housing 20 is press-fitted into the outer cylinder 40, and the housing 20 is easily press-fitted into the outer cylinder 40.

As described above, FIG. 2 shows an example of the gas sensor 1 in which C chamfering is performed on the end portion on the rear end side of the outer peripheral surface 210 of the housing 20. That is, in the gas sensor 1 shown in FIG. 2, chamfering is performed on the end portion on the rear end side of the outer peripheral surface 210 of the housing 20 linearly. By the chamfering, as shown in FIG. 2, the corner surface Af having a single linear cross-sectional shape is formed on the rear end side of the housing 20. However, it is not essential for the gas sensor 1 that the corner surface Af formed on the rear end side of the "housing having a cylindrical shape and made of metal, in which a sensor element penetrates an inside in an axial direction" (for example, the housing 20) by chamfering has a single linear cross-sectional shape. That is, it is not essential for the gas sensor 1 that the corner surface Af formed by chamfering performed on the rear end of the outer peripheral surface of the housing has a single linear cross-sectional shape. Although details will be described later, the corner surface Af as shown in FIGS. 6A and 6B may be formed on the rear end side of the "housing having a cylindrical shape and made of metal, in which a sensor element penetrates an inside in an axial direction" by chamfering. FIGS. 6A and 6B show examples of the corner surface Af having a cross-sectional shape including a plurality of linear portions. That is, in the gas sensor 1, the surface (corner surface) formed on the rear end side of the "housing having a cylindrical shape and made of metal, in which a sensor element penetrates an inside in an axial direction" by chamfering may include a plurality of linear portions in the cross-sectional shape.

Further, it is not essential for the gas sensor 1 to perform chamfering on the end portion on the rear end side of the outer peripheral surface of the "housing having a cylindrical shape and made of metal, in which a sensor element penetrates an inside in an axial direction" (for example, the housing 20). Even when chamfering is performed on the end portion on the rear end side of the outer peripheral surface of the housing, it is not essential for the gas sensor 1 to adopt C chamfering as the chamfering.

As described above, in the gas sensor 1 in the present embodiment, the contact distance Lg, which is the length in the axial direction AX of the outer peripheral surface 210 of the housing 20 in contact with the inner peripheral surface 410 of the outer cylinder 40 on the rear end side of the molten portion 420 of the outer cylinder 40, may be equal to or less than the reference distance Lr. For the gas sensor 1, whether or not to perform chamfering on the end portion on the rear end side of the outer peripheral surface 210 of the housing 20, and what type of chamfering is to be performed in the case of performing chamfering are appropriately selected according to the usage method, the usage location, and the like of the gas sensor 1. That is, in the gas sensor 1 in which the contact distance Lg is equal to or less than the reference distance Lr, there are various shapes of the corner portion on the rear end side of the "housing having a cylindrical shape and made of metal, in which a sensor element penetrates an inside in an axial direction" (corner portion facing the inner peripheral surface 410 of the outer cylinder 40). Hereinafter, representative examples of the shape of the corner portion on the rear end side of the "housing having a cylindrical shape and made of metal, in which a sensor element penetrates an inside in an axial direction" provided in the gas sensor 1 in which the contact distance Lg is equal to or less than the reference distance Lr will be described.

(Housing According to First Modification)

Figure 3:
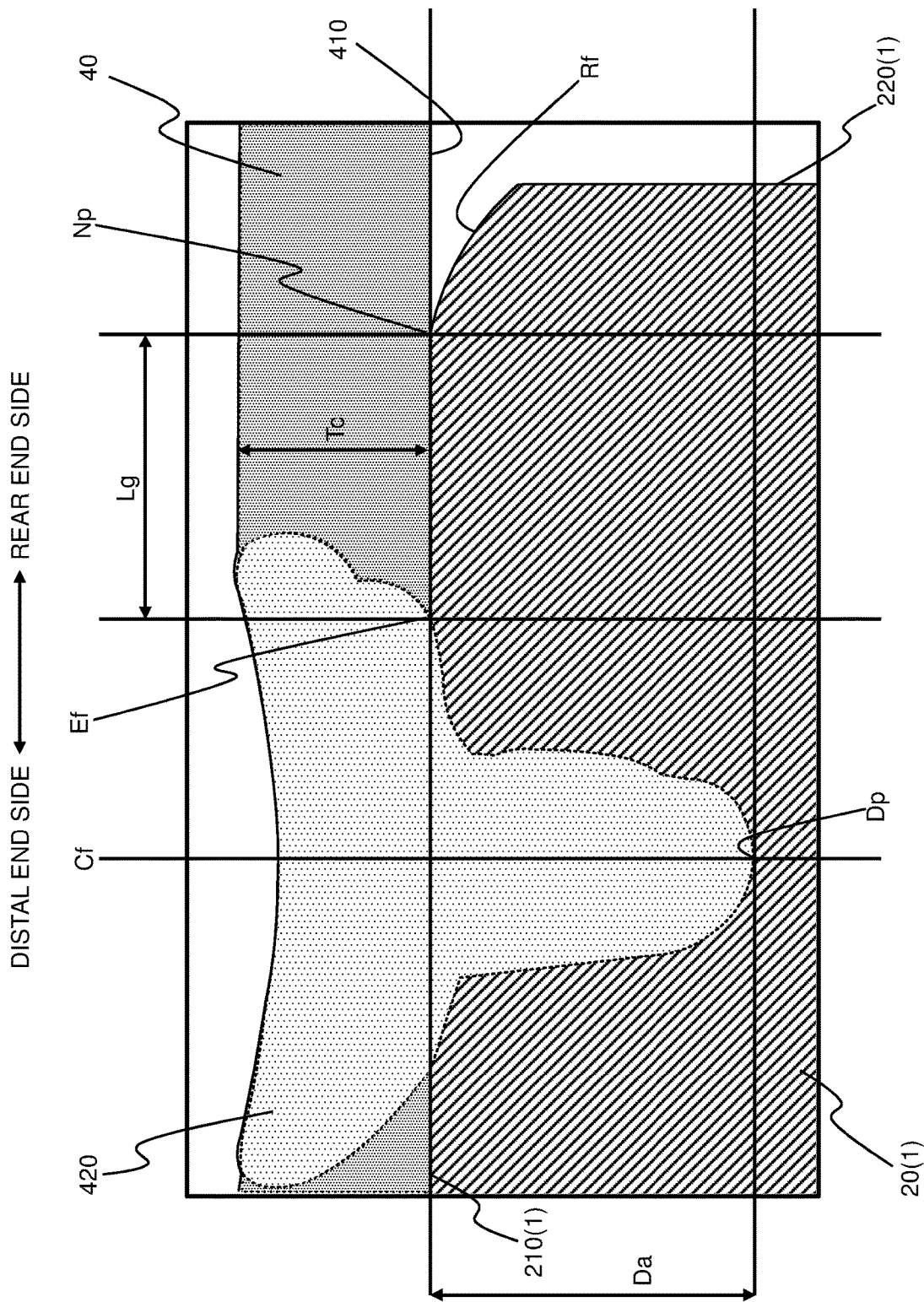
FIG. 3 is an enlarged cross-sectional view schematically showing a relationship between a housing according to a first modification and the outer cylinder around a welding position.

FIG. 3 is an enlarged cross-sectional view schematically showing a relationship between a housing 20 (1) according to a first modification and the outer cylinder 40 around the welding position Wp. In FIG. 3, the horizontal direction of the drawing sheet is the axial direction AX. In the housing 20 shown in FIG. 2, C chamfering is performed on the corner portion on the rear end side (corner portion facing the inner peripheral surface 410 of the outer cylinder 40). That is, C chamfering is performed on the end portion (corner portion) on the rear end side of the outer peripheral surface 210 of the housing 20, and the corner surface Af having a single linear cross-sectional shape is formed between the outer peripheral surface 210 and the rear end surface 220 of the housing 20. On the other hand, in the housing 20(1) shown in FIG. 3, R chamfering is performed on the corner portion on the rear end side (corner portion facing the inner peripheral surface 410 of the outer cylinder 40). That is, R chamfering is performed on an end portion (corner portion) on the rear end side of an outer peripheral surface 210(1) of the housing 20(1), and a round surface Rf having a single curved cross-sectional shape is formed between an outer peripheral surface 210(1) and a rear end surface 220(1) of the housing 20(1).

The housing 20(1) shown in FIG. 3 is similar to the housing 20 shown in FIG. 2 except that R chamfering is performed on the corner portion on the rear end side instead of C chamfering. That is, similarly to the housing 20, the housing 20(1) is a member having a cylindrical shape and made of metal, and the elongated sensor element 10 penetrates the inside in the axial direction AX. As shown in FIG. 3, the outer cylinder 40 made of metal is attached to the outer peripheral surface 210(1) of the housing 20(1). The outer cylinder 40 is attached to the outer peripheral surface 210(1) of the housing 20(1) by press-fitting a part of the rear end side of the housing 20(1) and welding in the circumferential direction at an overlapping portion with the press-fitted housing 20(1). The contact distance Lg, which is the length in the axial direction AX of the outer peripheral surface 210(1) of the housing 20(1) in contact with the inner peripheral surface 410 of the outer cylinder 40 on the rear end side of the molten portion 420 of the outer cylinder 40 formed by welding, is equal to or less than the reference distance Lr.

In the example shown in FIG. 3, the molten portion end Ef indicates an "end point where the molten portion 420 is in contact with the outer peripheral surface 210(1) of the housing 20(1)" on the rear end side of the molten portion center Cf in the axial direction AX. The molten portion end Ef may be rephrased as a "rear end in the axial direction AX of the molten portion 420 in contact with the housing 20(1)". Further, the molten portion end Ef may be rephrased as a contact position between the outer peripheral surface 210(1) of the housing 20(1), the inner peripheral surface 410 of the outer cylinder 40, and the molten portion 420 on the rear end side of the molten portion center Cf in the axial direction AX. The non-contact position Np indicates a position where the outer peripheral surface 210(1) of the housing 20(1) and the inner peripheral surface 410 of the outer cylinder 40 are not in contact with each other (position closest to the distal end side where both are not in contact) on the rear end side of the molten portion center Cf in the axial direction AX. The non-contact position Np may be rephrased as a position where the outer peripheral surface 210(1) of the housing 20(1) and the inner peripheral surface 410 of the outer cylinder 40 are not in contact with each other over the entire circumferential direction on the rear end side of the molten portion center Cf. Further, the non-contact position Np may be rephrased as a rear end of the outer peripheral surface 210(1) of the housing 20(1). As described above, in the example shown in FIG. 3, chamfering (R chamfering) is performed on the end portion on the rear end side of the outer peripheral surface 210(1) of the housing 20(1). Therefore, the non-contact position Np may be rephrased as a rear end of the outer peripheral surface 210(1) of the housing 20(1) after the chamfering is performed. The penetration depth Da indicates a depth in the radial direction of the housing 20(1) from the outer peripheral surface 210(1) of the housing 20(1) to the deepest portion Dp of the molten portion 420 dissolved in the housing 20(1). In the example shown in FIG. 3, the interference Tb represents an interference which is a difference between the outer diameter of the housing 20(1) and the inner diameter of the outer cylinder 40. In addition, since the molten portion center Cf, the thickness Tc of the outer cylinder 40, and the like in FIG. 3 are similar to those shown in FIG. 2, the description thereof will be omitted.

As described above, the contact distance Lg is the length in the axial direction AX of the outer peripheral surface 210(1) of the housing 20(1) in contact with the inner peripheral surface 410 of the outer cylinder 40 on the rear end side of the molten portion 420. Therefore, in the example shown in FIG. 3, the contact distance Lg can also be regarded as a distance between the position of the molten portion end Ef and the non-contact position Np. The contact distance Lg is equal to or less than the reference distance Lr. By setting the contact distance Lg to be equal to or less than the reference distance Lr, the gas sensor 1 allows the volatile gas in the molten portion 420 to escape from between the outer peripheral surface 210(1) of the housing 20(1) and the inner peripheral surface 410 of the outer cylinder 40, thereby suppressing the generation of pinholes in the molten portion 420.

As described above with reference to FIG. 3, in the gas sensor 1, R chamfering may be performed on the end portion on the rear end side of the outer peripheral surface 210(1) of the housing 20(1) having a cylindrical shape and made of metal in which the elongated sensor element 10 penetrates the inside in the axial direction AX. In the gas sensor 1, it is possible to suppress generation of burrs at the time of processing and suppress burr biting between the housing 20 and the outer cylinder 40 by employing R chamfering as chamfering performed on the end portion on the rear end side of the outer peripheral surface 210 of the housing 20.

As described above, FIG. 3 shows an example of the gas sensor 1 in which R chamfering is performed on the end portion on the rear end side of the outer peripheral surface 210(1) of the housing 20(1). That is, in the gas sensor 1 shown in FIG. 3, chamfering is performed on the end portion on the rear end side of the outer peripheral surface 210(1) of the housing 20(1) curvilinearly. By the chamfering, as shown in FIG. 3, the curved round surface Rf having a single curved cross-sectional shape is formed. However, it is not essential for the gas sensor 1 that the round surface Rf formed on the rear end side of the "housing having a cylindrical shape and made of metal, in which a sensor element penetrates an inside in an axial direction" by chamfering has a single curved cross-sectional shape. That is, it is not essential for the gas sensor 1 that the round surface Rf formed by chamfering performed on the rear end of the outer peripheral surface of the housing has a single curved cross-sectional shape. Although details will be described later, the round surface Rf as shown in FIG. 6C may be formed on the rear end side of the "housing having a cylindrical shape and made of metal, in which a sensor element penetrates an inside in an axial direction" by chamfering. FIG. 6C shows an example of the round surface Rf having a cross-sectional shape including a plurality of curved line portions. That is, in the gas sensor 1, the surface (round surface) formed on the rear end side of the "housing having a cylindrical shape and made of metal, in which a sensor element penetrates an inside in an axial direction" by chamfering may include a plurality of curved portions in the cross-sectional shape.

In the gas sensor 1, chamfering may be performed on the end portion on the rear end side of the outer peripheral surface of the "housing having a cylindrical shape and made of metal, in which a sensor element penetrates an inside in an axial direction" so that a surface having a cross-sectional shape including at least one of a linear portion and a curved portion is formed. For example, chamfering may be performed on the end portion on the rear end side of the outer peripheral surface of the "housing having a cylindrical shape and made of metal, in which a sensor element penetrates an inside in an axial direction" so that the corner surface Af or the round surface Rf having a cross-sectional shape including at least one of a linear portion and a curved portion is formed. The surface formed on the rear end side of the "housing having a cylindrical shape and made of metal, in which a sensor element penetrates an inside in an axial direction" by chamfering may include at least one of one or a plurality of linear portions and one or a plurality of curved portions in the cross-sectional shape. For example, FIG. 6D described later shows an example of the "housing having a cylindrical shape and made of metal, in which a sensor element penetrates an inside in an axial direction" in which a "surface including one linear portion and two curved portions in the cross-sectional shape" is formed on the rear end side by chamfering.

(Housing According to Second Modification)

Figure 4:
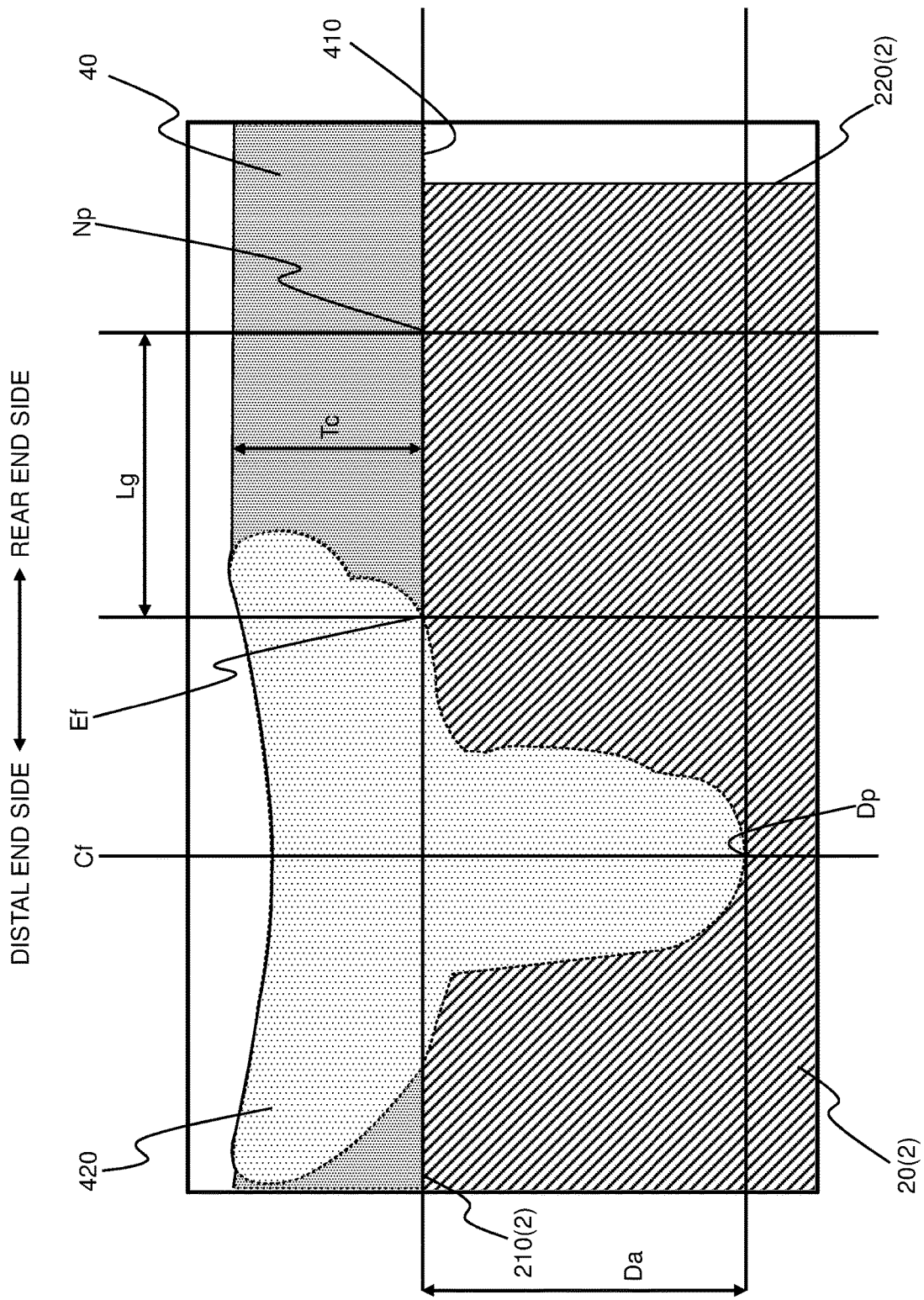
FIG. 4 is an enlarged cross-sectional view schematically showing a relationship between a housing according to a second modification and the outer cylinder around a welding position.

FIG. 4 is an enlarged cross-sectional view schematically showing a relationship between a housing 20(2) according to a second modification and the outer cylinder 40 around the welding position Wp. In FIG. 4, the horizontal direction of the drawing sheet is the axial direction AX. In the "housing having a cylindrical shape and made of metal, in which a sensor element penetrates an inside in an axial direction" (that is, the housings 20 and 20(1)) shown in FIGS. 2 and 3, chamfering is performed on the corner portion on the rear end side (corner portion facing the inner peripheral surface 410 of the outer cylinder 40). That is, C chamfering is performed on the end portion (corner portion) on the rear end side of the outer peripheral surface 210 of the housing 20, and R chamfering is performed on the end portion (corner portion) on the rear end side of the outer peripheral surface 210(1) of the housing 20(1). On the other hand, in the housing 20(2) shown in FIG. 4, chamfering is not performed on the corner portion on the rear end side (corner portion facing the inner peripheral surface 410 of the outer cylinder 40).

The housing 20(2) shown in FIG. 4 is similar to the housing 20 shown in FIG. 2 and the housing 20(1) shown in FIG. 3 except that chamfering is not performed on the corner portion on the rear end side. That is, similarly to the housings 20 and 20(1), the housing 20(2) is a member having a cylindrical shape and made of metal, and the elongated sensor element 10 penetrates the inside in the axial direction AX. As shown in FIG. 4, the outer cylinder 40 made of metal is attached to the outer peripheral surface 210(2) of the housing 20(2). The outer cylinder 40 is attached to the outer peripheral surface 210(2) of the housing 20(2) by press-fitting a part of the rear end side of the housing 20(2) and welding in the circumferential direction at an overlapping portion with the press-fitted housing 20(2). The contact distance Lg, which is the length in the axial direction AX of the outer peripheral surface 210(2) of the housing 20(2) in contact with the inner peripheral surface 410 of the outer cylinder 40 on the rear end side of the molten portion 420 of the outer cylinder 40 formed by welding, is equal to or less than the reference distance Lr.

In the example shown in FIG. 4, the molten portion end Ef indicates an "end point where the molten portion 420 is in contact with the outer peripheral surface 210(2) of the housing 20(2)" on the rear end side of the molten portion center Cf in the axial direction AX. The molten portion end Ef may be rephrased as a "rear end in the axial direction AX of the molten portion 420 in contact with the housing 20(2)". Further, the molten portion end Ef may be rephrased as a contact position between the outer peripheral surface 210(2) of the housing 20(2), the inner peripheral surface 410 of the outer cylinder 40, and the molten portion 420 on the rear end side of the molten portion center Cf in the axial direction AX. The non-contact position Np indicates a position where the outer peripheral surface 210(2) of the housing 20(2) and the inner peripheral surface 410 of the outer cylinder 40 are not in contact with each other (position closest to the distal end side where both are not in contact) on the rear end side of the molten portion center Cf in the axial direction AX. The non-contact position Np may be rephrased as a position where the outer peripheral surface 210(2) of the housing 20(2) and the inner peripheral surface 410 of the outer cylinder 40 are not in contact with each other over the entire circumferential direction on the rear end side of the molten portion center Cf. Further, the non-contact position Np may be rephrased as a rear end of the outer peripheral surface 210(2) of the housing 20(2). As described above, in the example shown in FIG. 4, chamfering is not performed on the end portion on the rear end side of the outer peripheral surface 210(2) of the housing 20(2). Therefore, the non-contact position Np may be rephrased as a position where the outer peripheral surface 210(2) and the rear end surface 220(2) of the housing 20(2) are in contact with each other. The penetration depth Da indicates a depth in the radial direction of the housing 20(2) from the outer peripheral surface 210(2) of the housing 20(2) to the deepest portion Dp of the molten portion 420 dissolved in the housing 20(2). In the example shown in FIG. 4, the interference Tb represents an interference which is a difference between the outer diameter of the housing 20(2) and the inner diameter of the outer cylinder 40. In addition, since the molten portion center Cf, the thickness Tc of the outer cylinder 40, and the like in FIG. 4 are similar to those shown in FIGS. 2 and 3, the description thereof will be omitted.

As described above, the contact distance Lg is the length in the axial direction AX of the outer peripheral surface 210(2) of the housing 20(2) in contact with the inner peripheral surface 410 of the outer cylinder 40 on the rear end side of the molten portion 420. Therefore, in the example shown in FIG. 4, the contact distance Lg can also be regarded as a distance between the position of the molten portion end Ef and the non-contact position Np. The contact distance Lg is equal to or less than the reference distance Lr.

As described above, the gas sensor 1 according to the present embodiment sets the contact distance Lg to be equal to or less than the reference distance Lr. By adopting the configuration, the gas sensor 1 allows the volatile gas in the molten portion 420 to escape from between the outer peripheral surface of the "housing having a cylindrical shape and made of metal, in which a sensor element penetrates an inside in an axial direction" and the inner peripheral surface 410 of the outer cylinder 40. As described with reference to FIG. 4, it is not essential for the gas sensor 1 according to the present embodiment to perform chamfering on the end portion on the rear end side of the outer peripheral surface of the "housing having a cylindrical shape and made of metal, in which a sensor element penetrates an inside in an axial direction" (for example, the housing 20(2)).

(Housing According to Third Modification)

Figure 5:
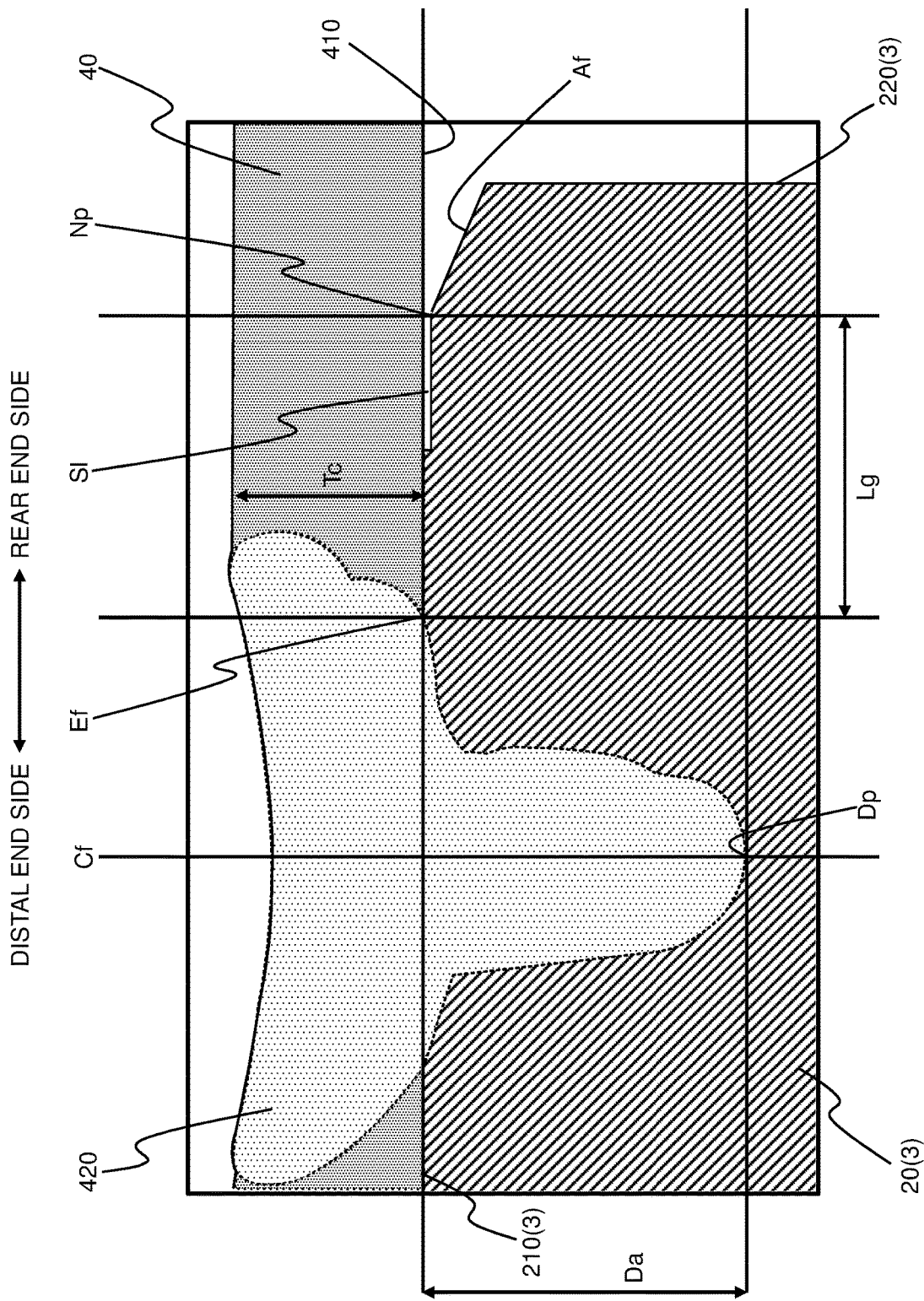
FIG. 5 is an enlarged cross-sectional view schematically showing a relationship between a housing according to a third modification and the outer cylinder around a welding position.

FIG. 5 is an enlarged cross-sectional view schematically showing a relationship between a housing 20(3) according to a third modification and the outer cylinder 40 around the welding position Wp. In FIG. 5, the horizontal direction of the drawing sheet is the axial direction AX. The "housing having a cylindrical shape and made of metal, in which a sensor element penetrates an inside in an axial direction" described so far with reference to FIGS. 2 to 4 has its outer peripheral surface in contact with the inner peripheral surface 410 of the outer cylinder 40 over the entire circumferential direction between the molten portion end Ef and the non-contact position Np. That is, in the housings 20, 20(1), and 20(2), the outer peripheral surface thereof is in contact with the inner peripheral surface 410 of the outer cylinder 40 over the entire circumferential direction between the molten portion end Ef and the non-contact position Np. On the other hand, in the housing 20(3) shown in FIG. 5, a slit Sl extending in the axial direction AX from the non-contact position Np to the distal end side is formed on an outer peripheral surface 210(3). Therefore, a part (specifically, a portion where the slit Sl is formed) of the outer peripheral surface 210(3) of the housing 20(3) is not in contact with the inner peripheral surface 410 of the outer cylinder 40 between the melted portion end Ef and the non-contact position Np.

Specifically, the slit Sl is formed on the outer peripheral surface 210(3) of the housing 20(3) shown in FIG. 5 on the rear end side of the molten portion 420 of the outer cylinder 40 formed by welding. In the example shown in FIG. 5, the slit Sl extends in the axial direction AX from the non-contact position Np to the distal end side.

The housing 20(3) shown in FIG. 5 is similar to the housing 20 shown in FIG. 2 except that the slit Sl extending in the axial direction AX is formed on the outer peripheral surface. That is, similarly to the housing 20, the housing 20(3) is a member having a cylindrical shape and made of metal, and the elongated sensor element 10 penetrates the inside in the axial direction AX. As shown in FIG. 5, the outer cylinder 40 made of metal is attached to the outer peripheral surface 210(3) of the housing 20(3). The outer cylinder 40 is attached to the outer peripheral surface 210(3) of the housing 20(3) by press-fitting a part of the rear end side of the housing 20(3) and welding in the circumferential direction at an overlapping portion with the press-fitted housing 20(3). The contact distance Lg, which is the length in the axial direction AX of the outer peripheral surface 210(3) of the housing 20(3) in contact with the inner peripheral surface 410 of the outer cylinder 40 on the rear end side of the molten portion 420 of the outer cylinder 40 formed by welding, is equal to or less than the reference distance Lr. That is, the contact distance Lg, which is the length in the axial direction AX at the portion where the slit Sl is not formed, of the outer peripheral surface 210(3) of the housing 20(3) in contact with the inner peripheral surface 410 of the outer cylinder 40 on the rear end side of the molten portion 420 is equal to or less than the reference distance Lr.

In the housing 20(3), similarly to the housing 20, C chamfering is performed on the corner portion on the rear end side (corner portion facing the inner peripheral surface 410 of the outer cylinder 40). That is, C chamfering is performed on the end portion (corner portion) on the rear end side of the outer peripheral surface 210(3) of the housing 20(3), and a corner surface Af having a single linear cross-sectional shape is formed between the outer peripheral surface 210(3) and a rear end surface 220(3) of the housing 20(3).

In the example shown in FIG. 5, the molten portion end Ef indicates an "end point where the molten portion 420 is in contact with the outer peripheral surface 210(3) of the housing 20(3)" on the rear end side of the molten portion center Cf in the axial direction AX. The molten portion end Ef may be rephrased as a "rear end in the axial direction AX of the molten portion 420 in contact with the housing 20(3)". Further, the molten portion end Ef may be rephrased as a contact position between the outer peripheral surface 210(3) of the housing 20(3), the inner peripheral surface 410 of the outer cylinder 40, and the molten portion 420 on the rear end side of the molten portion center Cf in the axial direction AX.

The non-contact position Np indicates a position where the outer peripheral surface 210(3) of the housing 20(3) and the inner peripheral surface 410 of the outer cylinder 40 are not in contact with each other (position closest to the distal end side where both are not in contact) on the rear end side of the molten portion center Cf in the axial direction AX. Here, as described above, the slit Sl is formed on the outer peripheral surface 210(3) of the housing 20(3) on the rear end side of the molten portion 420. Therefore, the non-contact position Np shown in FIG. 5 may be rephrased as a position where the portion of the outer peripheral surface 210(3) of the housing 20(3) where the slit Sl is not formed and the inner peripheral surface 410 of the outer cylinder 40 are not in contact with each other on the rear end side of the molten portion center Cf in the axial direction AX. That is, the non-contact position Np shown in FIG. 5 may be rephrased as a position where the outer peripheral surface 210(3) of the housing 20(3) and the inner peripheral surface 410 of the outer cylinder 40 are not in contact with each other over the entire circumferential direction on the rear end side of the molten portion center Cf in the axial direction AX. Further, the non-contact position Np may be rephrased as a rear end of the outer peripheral surface 210(3) of the housing 20(3). As described above, in the example shown in FIG. 5, chamfering is performed on the end portion on the rear end side of the outer peripheral surface 210(3) of the housing 20(3) (C chamfering). Therefore, the non-contact position Np may be rephrased as a rear end of the outer peripheral surface 210(3) of the housing 20(3) after the chamfering is performed.

The penetration depth Da indicates a depth in the radial direction of the housing 20(3) from the outer peripheral surface 210(3) of the housing 20(3) to the deepest portion Dp of the molten portion 420 dissolved in the housing 20(3). In the example shown in FIG. 5, the interference Tb represents an interference which is a difference between the outer diameter of the housing 20(3) and the inner diameter of the outer cylinder 40. In addition, since the molten portion center Cf, the thickness Tc of the outer cylinder 40, and the like in FIG. 5 are similar to those shown in FIGS. 2 to 4, the description thereof will be omitted.

As described above, the contact distance Lg is the length in the axial direction AX of the outer peripheral surface 210(3) of the housing 20(3) in contact with the inner peripheral surface 410 of the outer cylinder 40 on the rear end side of the molten portion 420. In particular, with respect to the outer peripheral surface 210(3) where the slit Sl is formed, the contact distance Lg is the length in the axial direction AX at the portion where the slit Sl is not formed, of the outer peripheral surface 210(3) in contact with the inner peripheral surface 410 of the outer cylinder 40 on the rear end side of the molten portion 420. In the example shown in FIG. 5, the contact distance Lg can also be regarded as a distance between the position of the molten portion end Ef and the non-contact position Np at which the outer peripheral surface 210(3) of the housing 20(3) and the inner peripheral surface 410 of the outer cylinder 40 are not in contact with each other over the entire circumferential direction. The contact distance Lg is equal to or less than the reference distance Lr. By setting the contact distance Lg to be equal to or less than the reference distance Lr, the gas sensor 1 allows the volatile gas in the molten portion 420 to escape from between the outer peripheral surface 210(3) of the housing 20(3) and the inner peripheral surface 410 of the outer cylinder 40, thereby suppressing the generation of pinholes in the molten portion 420.

As described above, in the gas sensor 1, the slit Sl extending in the axial direction AX is formed on the outer peripheral surface 210(3) of the housing 20(3) on the rear end side of the molten portion 420 in the axial direction AX. Here, although details will be described later, the present inventors have confirmed that the effect of suppressing the generation of pinholes can be improved by forming the slit Sl extending in the axial direction AX on the outer peripheral surface 210(3) of the housing 20(3) as compared with the case where the slit Sl is not formed. For example, it is considered that the "distance by which the volatile gas can move between the outer peripheral surface 210(3) of the housing 20(3) and the inner peripheral surface 410 of the outer cylinder 40 by its own pressure" can be lengthened by the slit Sl. Therefore, in the gas sensor 1, it is possible to further improve the effect of suppressing the generation of pinholes in the molten portion 420 by the slit Sl extending in the axial direction AX as compared with the case where the slit Sl is not formed.

As described above, on the outer peripheral surface 210 (3) of the housing 20(3) shown in FIG. 5, the slit Sl extending in the axial direction AX from the non-contact position Np to the distal end side is formed on the rear end side of the molten portion 420. In addition, C chamfering is performed on the end portion on the rear end side of the outer peripheral surface 210(3) of the housing 20(3). However, it is not essential for the gas sensor 1 that the slit Sl extends from the non-contact position Np to the distal end side. The slit Sl only needs to extend in the axial direction AX on the rear end side of the molten portion 420. Even if the slit Sl does not extend from the non-contact position Np, if the slit Sl extends in the axial direction AX, it is considered that the reachable distance of the volatile gas can be increased by the slit Sl, that is, the effect of suppressing the generation of pinholes can be improved.

Similarly, it is not essential for the gas sensor 1 that the slit Sl is formed on the outer peripheral surface 210(3) of the housing 20(3). The slit Sl only needs to be formed on the inner peripheral surface 410 of the outer cylinder 40, and the slit Sl only needs to be formed on at least one of the outer peripheral surface 210(3) of the housing 20(3) and the inner peripheral surface 410 of the outer cylinder 40.

In addition, a plurality of slits Sl provided at intervals in the circumferential direction of each of the housing 20(3) and the outer cylinder 40 may be formed on at least one of the outer peripheral surface 210(3) of the housing 20(3) and the inner peripheral surface 410 of the outer cylinder 40.

Furthermore, when the slit Sl is formed on at least one of the outer peripheral surface 210(3) of the housing 20(3) and the inner peripheral surface 410 of the outer cylinder 40, it is not essential that C chamfering is performed on the end portion on the rear end side of the outer peripheral surface 210(3). R chamfering may be performed or chamfering may not be performed on the end portion on the rear end side of the outer peripheral surface 210(3). For example, in the gas sensor 1, the slit Sl may be formed on the outer peripheral surface 210(1) of the housing 20(1) shown in FIG. 3. The gas sensor 1 may include the outer peripheral surface 210(1) of the housing 20(1) shown in FIG. 3 and the outer cylinder 40 in which the slit Sl is formed on the inner peripheral surface 410. Similarly, in the gas sensor 1, the slit Sl may be formed on the outer peripheral surface 210(2) of the housing 20(2) shown in FIG. 4. The gas sensor 1 may include the outer peripheral surface 210(2) of the housing 20(2) shown in FIG. 4 and the outer cylinder 40 in which the slit Sl is formed on the inner peripheral surface 410.

That is, in the gas sensor 1, the slit Sl extending in the axial direction AX may be formed on at least one of the outer peripheral surface 210(3) of the housing 20(3) and the inner peripheral surface 410 of the outer cylinder 40 on the rear end side of the molten portion 420 in the axial direction AX. In the gas sensor 1, the slit Sl may extend to the end surface on the rear end side of the housing 20(3) (rear end surface 220(3)), that is, may extend to the non-contact position Np. Further, in the gas sensor 1, a plurality of slits Sl provided at intervals in the circumferential direction may be formed on at least one of the outer peripheral surface 210(3) of the housing 20(3) and the inner peripheral surface 410 of the outer cylinder 40.

As described above, the present inventors have confirmed that the effect of suppressing the generation of pinholes can be improved by forming the slit Sl extending in the axial direction AX on at least one of the outer peripheral surface 210(3) and the inner peripheral surface 410 as compared with the case where the slit Sl is not formed. Therefore, in the gas sensor 1, it is possible to further improve the effect of suppressing the generation of pinholes in the molten portion 420 by the slit Sl extending in the axial direction AX as compared with the case where the slit Sl is not formed.

(Another Example of Chamfering Performed on Corner Portion of Housing)

FIG. 6 is an enlarged cross-sectional view showing an example of various kinds of chamfering performed on the corner portion (corner portion of the rear end side) of the "housing having a cylindrical shape and made of metal, in which a sensor element penetrates an inside in an axial direction" of the gas sensor 1. Specifically, FIG. 6 shows an example of chamfering performed on the corner portion of each of the housings 20(4) to 20(7), which is an example of the "housing having a cylindrical shape and made of metal, in which a sensor element penetrates an inside in an axial direction". In FIG. 6, the horizontal direction of the drawing sheet is the axial direction AX.

In the housing 20(4) shown in FIG. 6A, chamfering is performed on a corner portion (corner portion on the rear end side), so that a corner surface Af having a cross-sectional shape including a plurality of linear portions is formed on the rear end side of the housing 20(4). Specifically, an example of a corner surface Af formed on the rear end side of the housing 20(4) by chamfering and having a cross-sectional shape including two linear portions is shown. In the gas sensor 1 in which the contact distance Lg is equal to or less than the reference distance Lr, the corner surface Af shown in FIG. 6A may be formed on the rear end side of the "housing having a cylindrical shape and made of metal, in which a sensor element penetrates an inside in an axial direction".

In the housing 20(5) shown in FIG. 6B, chamfering is performed on a corner portion (corner portion on the rear end side), so that a corner surface Af having a cross-sectional shape including a plurality of linear portions is formed on the rear end side of the housing 20(5). Specifically, an example of a corner surface Af formed on the rear end side of the housing 20(5) by chamfering and having a cross-sectional shape including three linear portions is shown. In the gas sensor 1 in which the contact distance Lg is equal to or less than the reference distance Lr, the corner surface Af shown in FIG. 6B may be formed on the rear end side of the "housing having a cylindrical shape and made of metal, in which a sensor element penetrates an inside in an axial direction".

As described above with reference to FIGS. 6A and 6B, in the gas sensor 1, the corner surface Af having a cross-sectional shape including a plurality of linear portions may be formed on the rear end side of the "housing having a cylindrical shape and made of metal, in which a sensor element penetrates an inside in an axial direction".

In the housing 20(6) shown in FIG. 6C, chamfering is performed on a corner portion (corner portion on the rear end side), so that a round surface Rf having a cross-sectional shape including a plurality of linear portions is formed on the rear end side of the housing 20(6). Specifically, an example of a round surface Rf formed on the rear end side of the housing 20(6) by chamfering and having a cross-sectional shape including two curved portions is shown. In the gas sensor 1 in which the contact distance Lg is equal to or less than the reference distance Lr, the round surface Rf shown in FIG. 6C may be formed on the rear end side of the "housing having a cylindrical shape and made of metal, in which a sensor element penetrates an inside in an axial direction". That is, in the gas sensor 1, the round surface Rf having a cross-sectional shape including a plurality of curved portions may be formed on the rear end side of the "housing having a cylindrical shape and made of metal, in which a sensor element penetrates an inside in an axial direction".

In the housing 20(7) shown in FIG. 6D, chamfering is performed on a corner portion (corner portion on the rear end side), so that a surface ARf including a linear portion and a curved portion in the cross-sectional shape is formed on the rear end side of the housing 20(7). Specifically, an example of a surface ARf formed on the rear end side of the housing 20(7) by chamfering and having a cross-sectional shape including one linear portion and two curved portions is shown. In the gas sensor 1 in which the contact distance Lg is equal to or less than the reference distance Lr, the surface ARf shown in FIG. 6D may be formed on the rear end side of the "housing having a cylindrical shape and made of metal, in which a sensor element penetrates an inside in an axial direction". That is, in the gas sensor 1, a surface including at least one of one or a plurality of linear portions and one or a plurality of curved portions in the cross-sectional shape may be formed on the rear end side of the "housing having a cylindrical shape and made of metal, in which a sensor element penetrates an inside in an axial direction".

As described above, the gas sensor 1 includes the "housing having a cylindrical shape and made of metal, in which a sensor element penetrates an inside in an axial direction" and the outer cylinder 40 made of metal attached to the outer peripheral surface of the housing. The gas sensor 1 sets the "the length in the axial direction AX of the outer peripheral surface of the housing in contact with the inner peripheral surface 410 of the outer cylinder 40 on the rear end side of the molten portion 420" to be equal to or less than the reachable distance of the volatile gas in the molten portion 420, for example, equal to or less than the reference distance Lr.

In the gas sensor 1 described above, chamfering may be performed on the end portion on the rear end side of the outer peripheral surface of the housing. For example, chamfering may be performed on the end portion on the rear end side of the outer peripheral surface of the housing linearly or curvilinearly. Specifically, in the gas sensor 1, at least one of C chamfering and R chamfering may be performed on the end portion on the rear end side of the outer peripheral surface of the housing. In the gas sensor 1, the end portion on the rear end side of the outer peripheral surface of the chamfered housing can be used as a guide when the housing is press-fitted into the outer cylinder 40, and the housing is easily press-fitted into the outer cylinder 40.

[Features]

As described above, the gas sensor 1 according to the present embodiment includes a housing having a cylindrical shape and made of metal in which the elongated sensor element 10 penetrates the inside in the axial direction AX, and the outer cylinder 40 made of metal attached to the outer peripheral surface 210 of the housing. The "housing having a cylindrical shape and made of metal in which the elongated sensor element 10 penetrates the inside in the axial direction AX" of the gas sensor 1 is any of the housings 20 and 20 (1) to 20(7) described above, and is, for example, the housing 20. The outer cylinder 40 is attached to the outer peripheral surface 210 of the housing 20 by press-fitting a part of the rear end side of the housing 20 in the axial direction AX and welding in the circumferential direction at an overlapping portion with the press-fitted housing 20. For example, laser welding is performed in the circumferential direction at an overlapping portion between the housing 20 and the outer cylinder 40 (as an example, at the welding position Wp in FIG. 1), whereby the outer cylinder 40 is mounted on the outer peripheral surface 210 of the housing 20.

In the gas sensor 1, the contact distance Lg, which is the length in the axial direction AX of the outer peripheral surface 210 of the housing 20 in contact with the inner peripheral surface 410 of the outer cylinder 40 on the rear end side of the molten portion 420 of the outer cylinder 40 formed by welding, is equal to or less than the reference distance Lr. The reference distance Lr is calculated by the following formula (1) using the proportional constant k, the penetration depth Da, the interference Tb, and the thickness Tc.

$$Lr = k \times Da / (Tb \times Tc) \quad \text{Formula (1)}$$

As described above, the penetration depth Da represents the depth in the radial direction of the housing 20 from the outer peripheral surface 210 of the housing 20 to the deepest portion Dp of the molten portion 420 dissolved in the housing 20. The interference Tb represents an interference which is a difference between the outer diameter of the housing 20 and the inner diameter of the outer cylinder 40. The thickness Tc represents the thickness of the outer cylinder 40. The molten portion 420 may be rephrased as a portion of the outer cylinder 40 whose structure is changed by melting.

The reference distance Lr indicates, for example, the maximum distance f of the distance (reachable distance) that the volatile gas can reach by its own pressure, that is, the maximum value of the reachable distances. That is, the reference distance Lr is, for example, the maximum value of the distance (reachable distance) by which the volatile gas can move between the outer peripheral surface 210 of the housing 20 and the inner peripheral surface 410 of the outer cylinder 40 that are in contact with each other by its own pressure. The reachable distance of the volatile gas has the following relationship with each of the penetration depth Da, the interference Tb, and the thickness Tc. That is, as the penetration depth Da increases, the reachable distance of the volatile gas increases, as the interference Tb increases, the reachable distance of the volatile gas decreases, and as the thickness Tc increases, the reachable distance of the volatile gas decreases. Therefore, the reference distance Lr, which is the maximum value of the reachable distance, can be expressed as a function of the penetration depth Da, the interference Tb, and the thickness Tc. In addition, k, which is a proportional constant, can be obtained by a test or the like. Therefore, the reference distance Lr is calculated by the above formula (1) that is a function of k, which is a proportional constant, the penetration depth Da, the interference Tb, and the thickness Tc.

In the gas sensor 1, the contact distance Lg is equal to or less than the reference distance Lr, that is, the "length in the axial direction AX of the outer peripheral surface 210 of the housing 20 in contact with the inner peripheral surface 410 of the outer cylinder 40 on the rear end side of the molten portion 420" is equal to or less than the reference distance Lr. The contact distance Lg may be rephrased as a length in the axial direction AX from the position of the molten portion end Ef to the non-contact position Np. As described above, the molten portion end Ef is an end point where the molten portion 420 is in contact with the outer peripheral surface 210 of the housing 20 on the rear end side of the center (molten portion center Cf) of the molten portion 420 in the axial direction AX. Further, the non-contact position Np is a position where the outer peripheral surface 210 of the housing 20 and the inner peripheral surface 410 of the outer cylinder 40, which are on the rear end side of the molten portion center Cf, are not in contact with each other over the entire circumferential direction, and is, for example, the rear end of the outer peripheral surface 210 of the housing 20.

In the gas sensor 1, since the contact distance Lg is equal to or less than the reference distance Lr, the volatile gas generated at the time of welding between the outer peripheral surface 210 of the housing 20 and the inner peripheral surface 410 of the outer cylinder 40 in contact with each other can move to the non-contact position Np by its own pressure. That is, in the gas sensor 1, the volatile gas can move to a position (for example, the rear end of the outer peripheral surface 210 of the housing 20) where the outer peripheral surface 210 of the housing 20 and the inner peripheral surface 410 of the outer cylinder 40 are not in contact with each other over the entire circumferential direction by its own pressure. At the time of welding, for example, the volatile gas in the molten portion 420 can move to the "position where the outer peripheral surface 210 of the housing 20 and the inner peripheral surface 410 of the outer cylinder 40 are not in contact with each other over the entire circumferential direction" by its own pressure. That is, in the gas sensor 1, the volatile gas generated at the time of welding can move to the non-contact position Np by its own pressure, and is released (discharged) at the non-contact position Np. Therefore, in the gas sensor 1, it is possible to reduce the possibility that the volatile gas is trapped in the molten portion 420 to generate pinholes in the molten portion 420, that is, can suppress the generation of pinholes in the molten portion 420.

Therefore, the gas sensor 1 includes the housing 20 made of metal through which the sensor element 10 is inserted and the outer cylinder 40 made of metal welded to the outer periphery of the housing 20, and the generation of pinholes in the molten portion 420 can be suppressed.

In addition, in the gas sensor 1, it is possible to suppress the generation of pinholes in the molten portion 420 by setting the contact distance Lg to be equal to or less than the reference distance Lr calculated by the formula (1). As described above, k, which is a proportional constant in the formula (1), can be obtained in advance by a test or the like. Therefore, the gas sensor 1 can determine a structure for suppressing the generation of pinholes at the design stage, and for example, the value of the contact distance Lg can be determined to be equal to or less than the reference distance Lr at the design stage. Furthermore, in the gas sensor 1, it is possible to suppress the generation of pinholes to suppress a possibility of occurrence of defects such as generation of corrosion and deterioration in sealing performance caused by the pinholes. In addition, since in the gas sensor 1, it is possible to realize a structure that suppresses the generation of pinholes at the design stage, the generation of pinholes can be suppressed without changing a welding condition or the like from a conventional one. In addition, since the gas sensor 1 does not require a process of sufficiently cleaning each of the housing 20 and the outer cylinder 40 so that oil or the like does not remain on the contact surface between the housing 20 and the outer cylinder 40, it is possible to suppress man-hours in management and processes required for manufacturing.

Modifications

Although the embodiment of the present invention has been described above, the above description of the embodiment is merely an example of the present invention in all respects. Various improvements and modifications may be made to the above embodiment. With respect to each component of the above embodiment, omission, replacement, and addition of the component may be appropriately performed. In addition, the shape and dimension of each component of the above embodiment may be appropriately changed according to the embodiment. For example, the following modifications are possible. In the following description, the same reference numerals are used for the same components as those of the above embodiment, and the description of the same points as those of the above embodiment is appropriately omitted. The following modifications can be appropriately combined.

(Configuration of Gas Sensor)

An example in which the gas sensor 1 according to the present embodiment includes the sensor element holding member 30 and the outer protection cover 50 has been described above. However, it is not essential for the gas sensor 1 according to the present embodiment to include the sensor element holding member 30 and the outer protection cover 50, and the gas sensor 1 may not include at least one of the sensor element holding member 30 and the outer protection cover 50. In addition, the gas sensor 1 may have a configuration other than the sensor element 10, the housing 20, the sensor element holding member 30, the outer cylinder 40, and the outer protection cover 50.

For example, the gas sensor 1 may further include an inner protective cover having a bottomed cylindrical shape that covers the distal end of the sensor element 10 in addition to the outer protection cover 50 having a bottomed cylindrical shape that surrounds the distal end of the sensor element 10. That is, the gas sensor 1 may be configured such that the inner protective cover that covers the distal end of the sensor element 10 is further covered with the outer protection cover 50. The inner protective cover may be made of metal. The gas sensor 1 may further include another protective cover in addition to the inner protective cover and the outer protection cover 50 described above. For example, the gas sensor 1 may further include an intermediate protection cover disposed between the inner protection cover and the outer protection cover 50 in addition to the inner protection cover and the outer protection cover 50. That is, the gas sensor 1 may protect the vicinity of the distal end of the sensor element 10 with a plurality of protective covers (for example, the inner cover in addition to the outer protection cover 50).

(Slit)

An example of the gas sensor 1 in which the slit Sl extending in the axial direction AX is formed on at least one of the outer peripheral surface 210(3) of the housing 20(3) and the inner peripheral surface 410 of the outer cylinder 40 on the rear end side of the molten portion 420 in the axial direction AX has been described with reference to FIG. 5. However, on the rear end side of the molten portion 420 in the axial direction AX, the slit Sl formed on at least one of the outer peripheral surface 210(3) of the housing 20(3) and the inner peripheral surface 410 of the outer cylinder 40 may not extend in the axial direction AX. For example, on the rear end side of the molten portion 420 in the axial direction AX, the slit Sl extending in the circumferential direction may be formed on at least one of the outer peripheral surface 210(3) of the housing 20(3) and the inner peripheral surface 410 of the outer cylinder 40. That is, the slit Sl extending in the circumferential direction may be formed on at least one of the outer peripheral surface 210(3) and the inner peripheral surface 410 of the outer cylinder 40 between the molten portion end Ef and the non-contact position Np (rear end of the outer peripheral surface 210(3) of the housing 20(3)). It is considered that the "distance by which the volatile gas can move between the outer peripheral surface 210(3) and the inner peripheral surface 410 by its own pressure" can be lengthened also by the slit Sl extending in the circumferential direction, that is, it is considered that the generation of pinholes can be suppressed.

Examples

In order to verify the effect of the present invention, gas sensors according to the following levels 1 to 7 and a gas sensor according to Ref were produced. However, the present invention is not limited to the gas sensor according to each of the following levels and the gas sensor according to Ref.

TABLE 1

| Level | Lr/Lg | Slit structure | Ratio of number of generated pinholes | Pinhole reduction effect |
|---|---|---|---|---|
| Level 1 | 0.37 | Absent | 1.07 | X |
| Level 2 | 0.71 | Absent | 1.08 | X |
| Ref | 1.00 | Absent | 1.00 | ○ |
| Level 3 | 1.11 | Absent | 0.92 | ○ |
| Level 4 | 1.23 | Absent | 0.89 | ○ |
| Level 5 | 1.23 | Present | 0.80 | ○ |
| Level 6 | 1.35 | Absent | 0.60 | ⊙ |
| Level 7 | 1.92 | Absent | 0.25 | ⊙ |

In Table 1, the gas sensors according to the levels 1 and 2 have the same configuration as the gas sensor 1 shown in FIG. 1 except that the contact distance Lg is larger than the reference distance Lr. The gas sensor according to Ref is a gas sensor used as a reference at the time of verifying the effect of the present invention, has the same configuration as the gas sensor 1 shown in FIG. 1, and the contact distance Lg is equal to the reference distance Lr. The gas sensors according to the levels 3 to 7 have the same configuration as the gas sensor 1 shown in FIG. 1, and the contact distance Lg is smaller than the reference distance Lr.

In Table 1, "Lr/Lg" indicates the ratio of the reference distance Lr to the contact distance Lg. For example, in the gas sensor according to the level 1, the ratio of the reference distance Lr to the contact distance Lg is "0.37", that is, the reference distance Lr is 0.37 times the contact distance Lg, and the contact distance Lg is larger than the reference distance Lr. Similarly, in the gas sensor according to the level 2, the reference distance Lr is 0.71 times the contact distance Lg, and the contact distance Lg is larger than the reference distance Lr. In the gas sensor according to Ref, the reference distance Lr is equal to the contact distance Lg. In the gas sensor according to the level 3, the reference distance Lr is 1.11 times the contact distance Lg, and the contact distance Lg is smaller than the reference distance Lr. In the gas sensors according to the level 4 and the level 5, the reference distance Lr is 1.23 times the contact distance Lg, and the contact distance Lg is smaller than the reference distance Lr. In the gas sensor according to the level 6, the reference distance Lr is 1.35 times the contact distance Lg, and the contact distance Lg is smaller than the reference distance Lr. In the gas sensor according to the level 7, the reference distance Lr is 1.92 times the contact distance Lg, and the contact distance Lg is smaller than the reference distance Lr.

In Table 1, the "slit structure" indicates whether or not the slit Sl shown in FIG. 5 is formed on at least one of the outer peripheral surface 210 of the housing 20 and the inner peripheral surface 410 of the outer cylinder 40 for each of the gas sensors according to the levels 1 to 7. "Present" of the slit structure indicates, for example, that the slit Sl extending in the axial direction AX is formed on the outer peripheral surface 210 of the housing 20. "Absent" of the slit structure indicates that the slit Sl is not formed on either the outer peripheral surface 210 of the housing 20 or the inner peripheral surface 410 of the outer cylinder 40.

In Table 1, "Ratio of Number of Generated Pinholes" indicates a ratio of the "number of generated pinholes" confirmed for the gas sensor according to each level to the "number of pinholes generated in the molten portion 420" confirmed for the gas sensor according to Ref. That is, the "ratio of the number of generated pinholes" indicates how many times the number of generated pinholes confirmed for the gas sensor according to each level is the number of generated pinholes confirmed for the gas sensor according to Ref in which the contact distance Lg is equal to the reference distance Lr.

In Table 1, "Pinhole Reduction Effect" indicates the degree of the pinhole reduction effect confirmed for the gas sensor according to each level with respect to the effect of suppressing the generation of pinholes confirmed for the gas sensor according to Ref. The "effect of suppressing the generation of pinholes" may be rephrased as an "effect of reducing the number of generated pinholes". The pinhole reduction effect being "x (poor)" indicates that the pinhole reduction effect confirmed for the gas sensor according to each level is inferior to the pinhole reduction effect of the gas sensor according to Ref in which the contact distance Lg is equal to the reference distance Lr.

The pinhole reduction effect being "○ (good)" indicates that a pinhole reduction effect similar to the pinhole reduction effect confirmed for the gas sensor according to Ref in which the contact distance Lg is equal to the reference distance Lr is confirmed for the gas sensor according to each level. The pinhole reduction effect being "⊙ (remarkably good)" indicates that the pinhole reduction effect more favorable than the pinhole reduction effect confirmed for the gas sensor according to Ref in which the contact distance Lg is equal to the reference distance Lr is confirmed for the gas sensor according to each level.

That is, "Ratio of Number of Generated Pinholes" of the gas sensor according to the level 1 is "1.07", and the "number of pinholes generated in the molten portion 420" confirmed for the gas sensor according to the level 1 is larger than the number of generated pinholes confirmed for the gas sensor according to Ref. Therefore, "Pinhole Reduction Effect" of the gas sensor according to the level 1 is "x (poor)".

"Ratio of Number of Generated Pinholes" of the gas sensor according to the level 2 is "1.08", and the "number of pinholes generated in the molten portion 420" confirmed for the gas sensor according to the level 2 is larger than the number of generated pinholes confirmed for the gas sensor according to Ref. Therefore, "Pinhole Reduction Effect" of the gas sensor according to the level 2 is "x (poor)".

"Ratio of Number of Generated Pinholes" of the gas sensor according to the level 3 is "0.92", and the "number of pinholes generated in the molten portion 420" confirmed for the gas sensor according to the level 3 is slightly smaller than the number of generated pinholes confirmed for the gas sensor according to Ref. That is, the gas sensor according to the level 3 can achieve a pinhole reduction effect similar to the pinhole reduction effect confirmed for the gas sensor according to Ref, and "Pinhole Reduction Effect" of the gas sensor according to the level 3 is "○ (good)".

"Ratio of Number of Generated Pinholes" of the gas sensor according to the level 4 is "0.89", and the "number of pinholes generated in the molten portion 420" confirmed for the gas sensor according to the level 4 is slightly smaller than the number of generated pinholes confirmed for the gas sensor according to Ref. That is, the gas sensor according to the level 4 can achieve a pinhole reduction effect similar to the pinhole reduction effect confirmed for the gas sensor according to Ref, and "Pinhole Reduction Effect" of the gas sensor according to the level 4 is "○ (good)".

"Ratio of Number of Generated Pinholes" of the gas sensor according to the level 5 is "0.80", and the "number of pinholes generated in the molten portion 420" confirmed for the gas sensor according to the level 5 is slightly smaller than the number of generated pinholes confirmed for the gas sensor according to Ref. That is, the gas sensor according to the level 5 can achieve a pinhole reduction effect similar to the pinhole reduction effect confirmed for the gas sensor according to Ref, and "Pinhole Reduction Effect" of the gas sensor according to the level 5 is "○ (good)".

"Ratio of Number of Generated Pinholes" of the gas sensor according to the level 6 is "0.60", and the "number of pinholes generated in the molten portion 420" confirmed for the gas sensor according to the level 6 is extremely smaller than the number of generated pinholes confirmed for the gas sensor according to Ref. That is, the gas sensor according to the level 6 can achieve the pinhole reduction more favorable than the pinhole reduction effect confirmed for the gas sensor according to Ref, and "Pinhole Reduction Effect" of the gas sensor according to the level 6 is "⊙ (significantly good)".

"Ratio of Number of Generated Pinholes" of the gas sensor according to the level 7 is "0.25", and the "number of pinholes generated in the molten portion 420" confirmed for the gas sensor according to the level 7 is extremely smaller than the number of generated pinholes confirmed for the gas sensor according to Ref. That is, the gas sensor according to the level 7 can achieve the pinhole reduction more favorable than the pinhole reduction effect confirmed for the gas sensor according to Ref, and "Pinhole Reduction Effect" of the gas sensor according to the level 7 is "⊙ (significantly good)".

(Item 1 Confirmed from Table 1)

As shown in Table 1, "Pinhole Reduction Effect" of the gas sensor according to each of the levels 1 and 2 in which the contact distance Lg is larger than the reference distance Lr is "x (poor)". On the other hand, "Pinhole Reduction Effect" of the gas sensor according to each of the levels 3 to 7 in which the contact distance Lg is smaller than the reference distance Lr is "○ (good)" or "⊙ (remarkably good)". Further, for the gas sensor according to Ref in which the contact distance Lg is equal to the reference distance Lr, "Pinhole Reduction Effect" is "○". Therefore, the present inventors have confirmed that the following effects can be achieved by setting the contact distance Lg to be equal to or less than the reference distance Lr for the gas sensor 1 including the housing 20 through which the sensor element 10 is inserted and the outer cylinder 40 welded to the outer peripheral surface of the housing 20. That is, the present inventors have confirmed for the gas sensor 1 that the generation of pinholes in the molten portion 420 can be suppressed by setting the contact distance Lg to be equal to or less than the reference distance Lr.

"Ratio of Number of Generated Pinholes" of the gas sensor according to each of the levels 3 to 7 in which the contact distance Lg is smaller than the reference distance Lr is less than "1.00". That is, the generation of pinholes can be more suppressed in the gas sensors according to the levels 3 to 7 in which the contact distance Lg is smaller than the reference distance Lr than in the gas sensor according to Ref in which the contact distance Lg is equal to the reference distance Lr. Therefore, it is more desirable to make the contact distance Lg shorter than the reference distance Lr for the gas sensor 1 including the housing 20 through which the sensor element 10 is inserted and the outer cylinder 40 welded to the outer peripheral surface of the housing 20.

(Item 2 Confirmed from Table 1)

From the relationship between "Ratio of Number of Generated Pinholes" and "Lr/Lg (ratio of the reference distance Lr to the contact distance Lg)" shown in Table 1, the present inventors have confirmed that the ratio of the reference distance Lr to the contact distance Lg has the following tendency. That is, the present inventors have confirmed that the pinhole reduction effect (effect of suppressing the generation of pinholes) is rapidly improved by adjusting the size of the contact distance Lg such that the reference distance Lr is larger than 1.2 times the contact distance Lg. For example, the results in Table 1 are plotted on a graph with the horizontal axis representing "Lr/Lg" and the vertical axis representing the "ratio of the number of generated pinholes", and the present inventors have confirmed the following tendency with respect to the approximate curve obtained from the points corresponding to the standards 1 to 7 and Ref. That is, the present inventors have confirmed that the slope of the approximate curve rapidly increases around a point where the reference distance Lr becomes larger than 1.2 times the contact distance Lg.

Therefore, the following tendency can be confirmed for the gas sensor 1 including the "housing having a cylindrical shape and made of metal, in which a sensor element penetrates an inside in an axial direction" and the outer cylinder 40 welded to the outer peripheral surface of the housing. That is, it has been confirmed for the gas sensor 1 that the generation of pinholes in the molten portion 420 can be extremely effectively suppressed by making the reference distance Lr larger than 1.2 times the contact distance Lg.

(Item 3 Confirmed from Table 1)

The gas sensor according to the level 4 and the gas sensor according to the level 5 are common in that both "Lr/Lg" are "1.23". The gas sensor according to the level 4 is "Absent" in the slit structure, whereas the gas sensor according to the level 5 is "Present" in the slit structure. That is, the gas sensor according to the level 4 and the gas sensor according to the level 5 have the same configuration except for whether or not the slit Sl is formed on at least one of the outer peripheral surface 210 of the housing 20 and the inner peripheral surface 410 of the outer cylinder 40. The ratio of the number of generated pinholes of the gas sensor according to the level 4 is "0.89", whereas the ratio of the number of generated pinholes of the gas sensor according to the level 5 is "0.80". That is, the gas sensor according to the level 5 can suppress the generation of pinholes more than the gas sensor according to the level 4. Therefore, the present inventors have confirmed for the gas sensor 1 that the effect of suppressing the generation of pinholes can be improved by forming the slit Sl on at least one of the outer peripheral surface 210 of the housing 20 and the inner peripheral surface 410 of the outer cylinder 40 as compared with the case where the slit Sl is not formed. Therefore, the following tendency can be confirmed for the gas sensor 1 including the "housing having a cylindrical shape and made of metal, in which a sensor element penetrates an inside in an axial direction" and the outer cylinder 40 welded to the outer peripheral surface of the housing. That is, it has been confirmed that by forming the slit Sl on at least one of the outer peripheral surface of the housing and the inner peripheral surface 410 of the outer cylinder 40, the effect of suppressing the generation of pinholes in the molten portion 420 can be improved as compared with the case where the slit Sl is not formed.

REFERENCE SIGNS LIST

1 Gas sensor
10 Sensor element
20 Housing
40 Outer cylinder
210 Outer peripheral surface
410 Inner peripheral surface
420 Molten portion AX Axial direction
Lg Contact distance
Lr Reference distance
Da Penetration depth
Dp Deepest portion (deepest portion of molten portion)
k Proportional constant
Tb Interference
Tc Thickness
Sl Slit

The invention claimed is:

1. A gas sensor comprising:
a housing having a cylindrical shape and made of metal, in which an elongated sensor element penetrates an inside in an axial direction; and
an outer cylinder made of metal and mounted on an outer peripheral surface of the housing by press-fitting a part of a rear end side of the housing in the axial direction and performing welding in a circumferential direction at an overlapping portion with the press-fitted housing,
wherein a contact distance Lg, which is a length in the axial direction of the outer peripheral surface of the housing in contact with an inner peripheral surface of the outer cylinder on the rear end side with respect to a molten portion of the outer cylinder formed by the welding, is equal to or less than a reference distance Lr, and
the reference distance Lr is calculated by the following formula (1), $$Lr = k \times Da/(Tb \times Tc) \quad \text{Formula (1)}$$

in the formula (1),
"k" represents a proportional constant,
"Da" represents a depth from the outer peripheral surface of the housing to a deepest portion of the molten portion dissolved in the housing in a radial direction of the housing,
"Tb" represents an interference which is a difference between an outer diameter of the housing and an inner diameter of the outer cylinder, and
"Tc" represents the thickness of the outer cylinder.

2. The gas sensor according to claim 1, wherein the reference distance Lr is larger than 1.2 times the contact distance Lg.

3. The gas sensor according to claim 1, wherein chamfering is performed on an end portion on the rear end side of the outer peripheral surface of the housing.

4. The gas sensor according to claim 3, wherein the chamfering is R chamfering.

5. The gas sensor according to claim 1, wherein a slit extending in the axial direction is formed in at least one of the outer peripheral surface of the housing and the inner peripheral surface of the outer cylinder on the rear end side of the molten portion in the axial direction of each of the outer cylinder and the housing.

6. The gas sensor according to claim 2, wherein chamfering is performed on an end portion on the rear end side of the outer peripheral surface of the housing.

7. The gas sensor according to claim 6, wherein the chamfering is R chamfering.

8. The gas sensor according to claim 2, wherein a slit extending in the axial direction is formed in at least one of the outer peripheral surface of the housing and the inner peripheral surface of the outer cylinder on the rear end side of the molten portion in the axial direction of each of the outer cylinder and the housing.

* * * * *